(12) United States Patent
Sasaki et al.

(10) Patent No.: US 11,905,390 B2
(45) Date of Patent: Feb. 20, 2024

(54) RESIN COMPOSITION, RESIN MOLDED ARTICLE, AND METHOD OF PRODUCING RESIN MOLDED ARTICLE

(71) Applicant: FUJIFILM Corporation, Tokyo (JP)

(72) Inventors: Daisuke Sasaki, Shizuoka (JP); Yoshihiro Jimbo, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/703,862

(22) Filed: Dec. 5, 2019

(65) Prior Publication Data
US 2020/0109254 A1    Apr. 9, 2020

Related U.S. Application Data

(63) Continuation of application No. PCT/JP2018/021932, filed on Jun. 7, 2018.

(30) Foreign Application Priority Data

Jun. 8, 2017 (JP) .................. 2017-113819

(51) Int. Cl.
| | | |
|---|---|---|
| *C08K 5/00* | (2006.01) | |
| *C09B 23/01* | (2006.01) | |
| *C08J 3/20* | (2006.01) | |

(52) U.S. Cl.
CPC ............. *C08K 5/0041* (2013.01); *C08J 3/203* (2013.01); *C09B 23/0066* (2013.01)

(58) Field of Classification Search
CPC ..... C08K 5/0041; C08J 3/203; C09B 23/0066
See application file for complete search history.

(56) References Cited

U.S. PATENT DOCUMENTS

| | | |
|---|---|---|
| 9,575,213 B2 | 2/2017 | Nagaya et al. |
| 9,791,596 B2 | 10/2017 | Nagaya et al. |
| 9,791,606 B2 | 10/2017 | Nagaya et al. |
| 2018/0120485 A1* | 5/2018 | Oota ................. H01L 27/14 |

FOREIGN PATENT DOCUMENTS

| | | | |
|---|---|---|---|
| CN | 105754367 | 7/2016 | |
| EP | 3299422 | 3/2018 | |
| JP | S63235370 | 9/1988 | |
| JP | H10104785 | 4/1998 | |
| JP | H10104785 A * | 4/1998 | ............. G03C 1/498 |
| JP | 2009062652 | 3/2009 | |
| JP | 2010184980 A * | 8/2010 | ............. C07D 239/70 |
| JP | 2014021421 | 2/2014 | |

(Continued)

OTHER PUBLICATIONS

"Office Action of Japan Counterpart Application", dated Apr. 21, 2020, with English translation thereof, p. 1-p. 8.
"International Search Report (Form PCT/ISA/210) of PCT/JP2018/021932", dated Aug. 7, 2018, with English translation thereof, pp. 1-5.
"Written Opinion of the International Searching Authority (Form PCT/ISA/237) of PCT/JP2018/021932", dated Aug. 7, 2018, with English translation thereof, pp. 1-9.
Office Action of China Counterpart Application, with English translation thereof, dated Mar. 30, 2021, pp. 1-15.
Office Action of China Counterpart Application, with English translation thereof, dated Apr. 29, 2022, pp. 1-12.
"Office Action of China Counterpart Application", dated Nov. 11, 2021, with English translation thereof, p. 1-p. 12.
Office Action of China Counterpart Application, with English translation thereof, dated Oct. 9, 2022, pp. 1-15.

*Primary Examiner* — Bijan Ahvazi
(74) *Attorney, Agent, or Firm* — JCIPRNET

(57) ABSTRACT

An embodiment of the present invention is to provide a resin composition including a near infrared absorbing coloring agent represented by Formula (1) and a resin, a resin molded article, and a method of producing a resin molded article. In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents the largest integer of $G^A$ which may be substituted in the ring A, $n_B$ represents the largest integer of $G^B$ which may be substituted in the ring B, $X^A$ and $G^A$, and $X^B$ and $G^B$ may be respectively bonded to one another to form a ring, and in a case where a plurality of $G^A$'s and $G^B$'s are present, the plurality of $G^A$'s and the plurality of $G^B$'s may be respectively bonded to one another to form a ring structure.

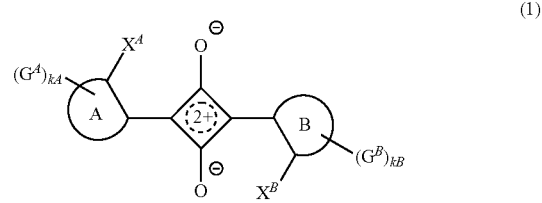

(1)

9 Claims, No Drawings

(56) References Cited

FOREIGN PATENT DOCUMENTS

| | | | | |
|---|---|---|---|---|
| JP | 2015101815 | 6/2015 | | |
| WO | 2015025779 | 2/2015 | | |
| WO | WO-2015025779 A1 * | 2/2015 | ............. | G02B 5/208 |
| WO | 2016186050 | 11/2016 | | |

* cited by examiner

RESIN COMPOSITION, RESIN MOLDED ARTICLE, AND METHOD OF PRODUCING RESIN MOLDED ARTICLE

CROSS-REFERENCE TO RELATED APPLICATIONS

This application is a continuation application of International Application No. PCT/JP2018/021932, filed Jun. 7, 2018, which is incorporated herein by reference. Further, this application claims priority from Japanese Patent Application No. 2017-113819, filed Jun. 8, 2017, which is incorporated herein by reference.

BACKGROUND OF THE INVENTION

1. Field of the Invention

The present disclosure relates to a resin composition, a resin molded article, and a method of producing a resin molded article.

2. Description of the Related Art

In recent years, development of various applications for utilizing characteristics of near infrared absorbing coloring agents, for example, characteristics of absorbing light in an infrared region, characteristics of shielding light in the infrared region, and characteristics of absorbing light in a near infrared region and converting the light to heat has been suggested.

For example, a heat-ray shielding sheet which is a sheet containing a phthalocyanine compound having a specific structure and is attached to window glass so that an increase in indoor temperature is suppressed has been suggested (see JP2014-021421A). A dyeing method of immersing fibers in a dye bath that contains a chromium metal-containing dye specific to a metal mordant dye to obtain infrared absorbing fibers which have an infrared reflectivity of 30% or less and are capable of preventing transmission of infrared rays into clothes at the time of infrared ray imaging has been suggested (see JP2009-062652A). Further, functional fibers which are thermoplastic fibers containing far infrared radioactive fine particles and formed by a near infrared absorbing agent adhering to the surface of each fiber, and thermal insulating fabric have been suggested (see JP2015-101815A).

SUMMARY OF THE INVENTION

As the near infrared absorbing coloring agents are used in various applications, the characteristics of invisibility and heat resistance have become important. For example, in a case where a near infrared absorbing coloring agent has a large absorption amount in a visible region visible to human eyes and, for example, a resin composition is employed, the appearance of the resin composition is changed depending on whether the near infrared absorbing coloring agent has been added or the content of the near infrared absorbing coloring agent. Further, the appearance of a resin molded article prepared using the resin composition also changes. Therefore, it is preferable that the near infrared absorbing coloring agent used for a resin composition has a small absorption amount in a visible region. The characteristic in which the near infrared absorbing coloring agent has a small absorption amount in a visible region is referred to as invisibility.

Further, the resin composition containing the near infrared absorbing coloring agent is heated and molded in some cases of being processed into a sheet or a pellet. Accordingly, the near infrared absorbing coloring agent used in the resin composition is required to have heat resistance in order to withstand the thermal molding temperature.

Examples of known near infrared absorbing coloring agents include cyanine, phthalocyanine, anthraquinone, and diimmonium. Cyanine and diimmonium have excellent invisibility, but are decomposed in some cases of being heated to the thermal molding temperature because the heat resistance thereof is low. Therefore, there is a problem in that a desired near infrared absorption capacity cannot be obtained.

There is a problem in that, although phthalocyanine, anthraquinone, and the like as near infrared absorbing coloring agents have excellent heat resistance, the invisibility is low because phthalocyanine, anthraquinone, and the like show absorption in a visible region.

An object of an embodiment of the present invention is to provide a resin composition which includes a near infrared absorbing coloring agent and in which a tint of the resin composition is not changed, the near infrared absorbing coloring agent is retained after being heated and melted, and the infrared absorption capacity is excellent.

Further, another object of another embodiment of the present invention is to provide a resin molded article which includes a near infrared absorbing coloring agent and in which a tint of the resin molded article is not changed, the near infrared absorbing coloring agent is retained after being heated and molded, and the infrared absorption capacity is excellent, and a method of producing the resin molded article.

Specific means for achieving the above-described objects include the following embodiments.

<1> A resin composition comprising: a near infrared absorbing coloring agent represented by Formula (1); and a resin.

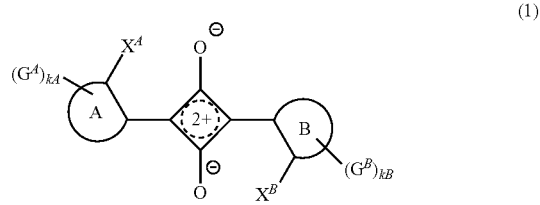

(1)

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents the largest integer of $G^A$ which may be substituted in the ring A, $n_B$ represents the largest integer of $G^B$ which may be substituted in the ring B, $X^A$ and $G^A$, and $X^B$ and $G^B$ may be respectively bonded to one another to form a ring, and in a case where a plurality of $G^A$'s and $G^B$'s are present, the plurality of $G^A$'s and the plurality of $G^B$'s may be respectively bonded to one another to form a ring structure.

<2> The resin composition according to <1>, in which the resin is at least one resin selected from the group consisting of polyester, polyamide, and polyurethane.

<3> The resin composition according to <1> or <2>, in which a content of the near infrared absorbing coloring agent represented by Formula (1) is 0.01% by mass to 5% by mass with respect to a mass of the resin.

<4> The resin composition according to any one of <1> to <3>, in which the near infrared absorbing coloring agent represented by Formula (1) includes a near infrared absorbing coloring agent represented by Formula (2).

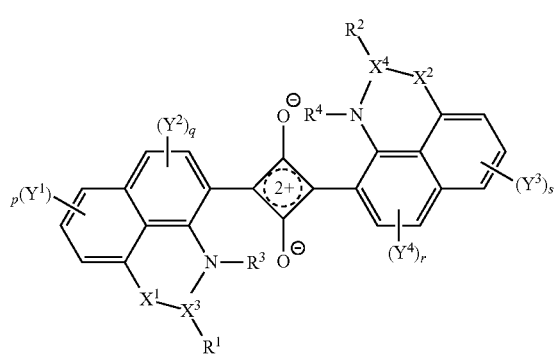

In Formula (2), $R^1$ and $R^2$ each independently represent a monovalent substituent, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each independently represent a carbon atom or a boron atom, $Y^1$, $Y^2$, $Y^3$, and $Y^4$ each independently represent a monovalent substituent, $Y^1$ and $Y^2$, and $Y^3$ and $Y^1$ may be respectively bonded to one another to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2.

<5> The resin composition according to any one of <1> to <4>, further comprising: a colorant.

<6> A resin molded article comprising: a near infrared absorbing coloring agent represented by Formula (1); and a resin.

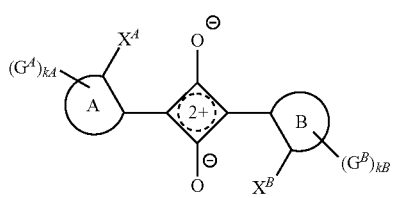

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents the largest integer of $G^A$ which may be substituted in the ring A, $n_B$ represents the largest integer of $G^B$ which may be substituted in the ring B, $X^A$ and $G^A$, and $X^B$ and $G^B$ may be respectively bonded to one another to form a ring, and in a case where a plurality of $G^A$'s and $G^B$'s are present, the plurality of $G^A$'s and the plurality of $G^B$'s may be respectively bonded to one another to form a ring structure.

<7> The resin molded article according to <6>, in which the resin is at least one resin selected from the group consisting of polyester, polyamide, and polyurethane.

<8> The resin molded article according to <6> or <7>, in which a content of the near infrared absorbing coloring agent represented by Formula (1) is 0.01% by mass to 5% by mass with respect to a mass of the resin.

<9> The resin molded article according to any one of <6> to <8>, in which the near infrared absorbing coloring agent represented by Formula (1) includes a near infrared absorbing coloring agent represented by Formula (2).

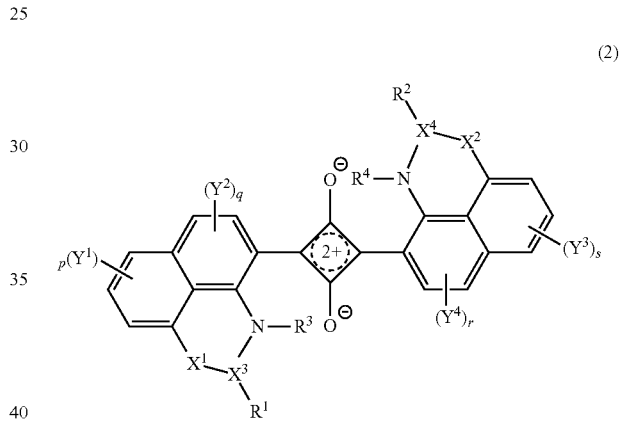

In Formula (2), $R^1$ and $R^2$ each independently represent a monovalent substituent, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each independently represent a carbon atom or a boron atom, $Y^1$, $Y^2$, $Y^3$, and $Y^4$ each independently represent a monovalent substituent, $Y^1$ and $Y^2$, and $Y^3$ and $Y^4$ may be respectively bonded to one another to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2.

<10> The resin molded article according to any one of <6> to <9>, further comprising: a colorant.

<11> A method of producing a resin molded article, comprising: a step of kneading a near infrared absorbing coloring agent represented by Formula (1) and a resin to obtain a resin kneaded material; and a step of molding the obtained resin kneaded material.

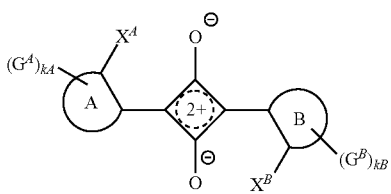

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents the largest integer of $G^A$ which may be substituted in the ring A, $n_B$ represents the largest integer of $G^B$ which may be substituted in the ring B, $X^A$ and $G^A$, and $X^B$ and $G^B$ may be respectively bonded to one another to form a ring, and in a case where a plurality of $G^A$'s and $G^B$'s are present, the plurality of $G^A$'s and the plurality of $G^B$'s may be respectively bonded to one another to form a ring structure.

<12> The method of producing a resin molded article according to <11>, in which the resin is at least one resin selected from the group consisting of polyester, polyamide, and polyurethane.

<13> The method of producing a resin molded article according to <11> or <12>, in which, in the step of kneading to obtain the resin kneaded material, the near infrared absorbing coloring agent represented by Formula (1) is mixed in an amount of 0.01% by mass to 5% by mass with respect to a mass of the resin.

<14> The method of producing a resin molded article according to any one of <11> to <13>, in which the near infrared absorbing coloring agent represented by Formula (1) includes a near infrared absorbing coloring agent represented by Formula (2).

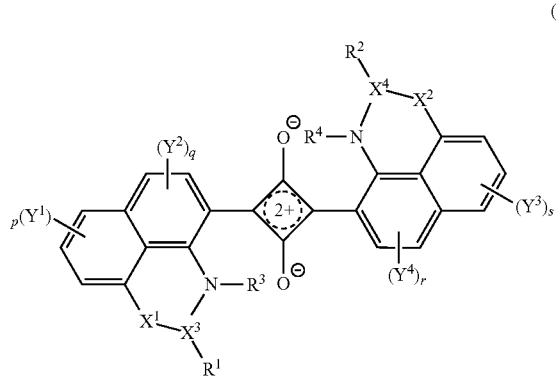

In Formula (2), $R^1$ and $R^2$ each independently represent a monovalent substituent, $R^3$ and $R^4$ each independently represent a hydrogen atom or an alkyl group, $X^1$ and $X^2$ each independently represent an oxygen atom or $-N(R^5)-$, $R^5$ represents a hydrogen atom, an alkyl group, an aryl group, or a heteroaryl group, $X^3$ and $X^4$ each independently represent a carbon atom or a boron atom, $Y^1$, $Y^2$, $Y^3$, and $Y^4$ each independently represent a monovalent substituent, $Y^1$ and $Y^2$, and $Y^3$ and $Y^4$ may be respectively bonded to one another to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2.

<15> The method of producing a resin molded article according to any one of <11> to <14>, in which a colorant is further kneaded in the resin kneaded material.

According to an embodiment of the present invention, it is possible to provide a resin composition which includes a near infrared absorbing coloring agent and in which a tint of the resin composition is not changed, the near infrared absorbing coloring agent is retained after being heated and melted, and the infrared absorption capacity is excellent.

Further, according to another embodiment of the present invention, it is possible to provide a resin molded article which includes a near infrared absorbing coloring agent and in which a tint of the resin molded article is not changed, the near infrared absorbing coloring agent is retained after being heated and molded, and the infrared absorption capacity is excellent, and a method of producing the resin molded article.

DESCRIPTION OF THE PREFERRED EMBODIMENTS

Hereinafter, a resin composition, a resin molded article, and a method of producing a resin molded article according to an embodiment of the present disclosure will be described in detail.

In the present specification, the numerical ranges shown using "to" indicate ranges including the numerical values described before and after "to" as the lower limits and the upper limits. In a numerical range described in a stepwise manner in the present specification, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present specification, in a case where the amount of each component in a composition is mentioned and a plurality of substances corresponding to each component in the composition are present, the amount of each component indicates the total amount of the plurality of components present in the composition.

In the present specification, a "solvent" indicates water, an organic solvent, or a mixed solvent of water and an organic solvent.

The "steps" in the present specification include not only independent steps but also steps whose intended purposes are achieved even in a case where the steps cannot be precisely distinguished from other steps.

<Resin Composition>

A resin composition according to the embodiment of the present disclosure includes a near infrared absorbing coloring agent represented by Formula (1) and a resin.

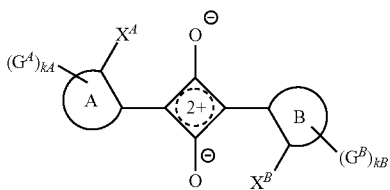

(1)

The term "resin composition" in the present specification is used to include a resin composition formed by mixing a near infrared absorbing coloring agent with a resin and a resin composition formed by adhering the near infrared absorbing coloring agent to the resin using a method of performing coating, immersion, or the like.

The mechanism of the resin composition according to the embodiment of the present disclosure is not clear, but is assumed as follows.

Since the near infrared absorbing coloring agent represented by Formula (1) does not show absorption in a visible region or absorbs an extremely small quantity of near infrared rays, the near infrared absorbing coloring agent has excellent invisibility. Therefore, the resin composition is a resin composition which does not impair the transparency specific to the resin and the tint of a colorant to be combined as desired. Accordingly, the resin composition according to the embodiment of the present disclosure can be provided for production of various molded articles having excellent infrared absorption capacity depending on the purpose thereof.

Further, it is considered that since the near infrared absorbing coloring agent represented by Formula (1) shows large absorption in a near infrared region and has excellent heat resistance, the resin composition according to the embodiment of the present disclosure retains a sufficient amount of the near infrared absorbing coloring agent and can maintain excellent infrared absorption capacity even in a case of being subjected to molding processing accompanied by heating such as heating, melting, and kneading.

Accordingly, the resin composition according to the embodiment of the present disclosure can be used to form various resin molded articles such as a security system for the purpose of preventing forgery through near infrared detection, an infrared-absorbing film, and heat storage synthetic fibers.

Further, the present disclosure is not limited by the assumed mechanism.

[Near Infrared Absorbing Coloring Agent Represented by Formula (1)]

The resin composition according to the embodiment of the present disclosure includes a near infrared absorbing coloring agent represented by Formula (1).

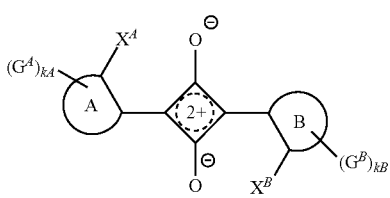

(1)

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents the largest integer of $G^A$ which may be substituted in the ring A, $n_B$ represents the largest integer of $G^B$ which may be substituted in the ring B, $X^A$ and $G^A$, and $X^B$ and $G^B$ may be respectively bonded to one another to form a ring, and in a case where a plurality of $G^A$'s and $G^B$'s are present, the plurality of $G^A$'s and the plurality of $G^B$'s may be respectively bonded to one another to form a ring structure.

A ring A and a ring B each independently represent an aromatic ring or a heteroaromatic ring.

The aromatic ring and the heteroaromatic ring may be a monocyclic or fused ring.

Specific examples of the aromatic ring and the heteroaromatic ring include a benzene ring, a naphthalene ring, a pentalene ring, an indene ring, an azulene ring, a heptalene ring, an indecene ring, a perylene ring, a pentacene ring, an acenaphthene ring, an acenaphthylene ring, a phenalene ring, a phenanthrene ring, an anthracene ring, a naphthacene ring, a chrysene ring, a biphenylene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolidine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, and a phenazine ring. Among these, a benzene ring or a naphthalene ring is preferable.

The aromatic ring and the heteroaromatic ring may be unsubstituted or may have a substituent. Examples of the substituent include a monovalent substituent described in the section of $G^A$ and $G^B$ later.

$X^A$ and $X^B$ each independently represent a monovalent substituent. Here, the monovalent substituent represented by $X^A$ and $X^B$ is preferably —OH, —SH, —COOH, —SO$_3$H, —NR$^{X1}$R$^{X2}$, —NHCOR$^{X1}$, —CONR$^{X1}$R$^{X2}$, —NHCONR$^{X1}$R$^{X2}$, —NHCOOR$^{X1}$, —NHSO$_2$R$^{X1}$, —B(OH)$_2$, or —PO(OH)$_2$ and more preferably —OH, —SH, or —NR$^{X1}$R$^{X2}$. The monovalent substituent represented by $X^A$ and $X^B$ is preferably a group having an active hydrogen.

$R^{X1}$ and $R^{X2}$ each independently represent a hydrogen atom, an alkyl halide, or a monovalent substituent. Examples of the monovalent substituent represented by $R^{X1}$ and $R^{X2}$ include an alkyl group, an alkenyl group, an alkynyl group, an aryl group, and a heteroaryl group. Among these, an alkyl group is preferable. It is preferable that the alkyl group is linear or branched.

The alkyl halide represented by $R^{X1}$ and $R^{X2}$ is preferably alkyl fluoride, alkyl chloride, alkyl bromide, or alkyl iodide and more preferably tertiary alkyl fluoride, tertiary alkyl chloride, tertiary alkyl bromide, or tertiary alkyl iodide.

The alkyl group represented by $R^{X1}$ and $R^{X2}$ has preferably 1 to 20 carbon atoms, more preferably 1 to 15 carbon atoms, and still more preferably 1 to 8 carbon atoms. The alkyl group may be any of linear, branched, or cyclic and is preferably linear or branched. Examples of the alkyl group include methyl, ethyl, iso-propyl, tert-butyl, n-octyl, n-decyl, n-hexadecyl, cyclopropyl, cyclopentyl, and cyclohexyl.

The alkenyl group represented by $R^{X1}$ and $R^{X2}$ has preferably 2 to 20 carbon atoms, more preferably 2 to 12 carbon atoms, and particularly preferably 2 to 8 carbon atoms. The alkenyl group may be any of linear, branched, or cyclic and is preferably linear or branched. Examples of the alkenyl group include vinyl, allyl, 3-butenyl, 2-methyl-2-butenyl, 4-pentenyl, 3-pentenyl, 3-methyl-3-pentenyl, 5-hexenyl, 4-hexenyl, 3-hexenyl, 2-hexenyl, cyclopentenyl, and a cyclohexenyl group.

The alkynyl group represented by $R^{X1}$ and $R^{X2}$ has preferably 2 to 40 carbon atoms, more preferably 2 to 30 carbon atoms, and particularly preferably 2 to 25 carbon atoms. The alkynyl group may be any of linear, branched, or cyclic and is preferably linear or branched. Examples of the alkynyl group include ethynyl, 1-propynyl, 2-propynyl, 1-butynyl, 2-butynyl, 3-butynyl, 2-methyl-2-propynyl, and 3-methyl-1-butynyl.

The aryl group represented by $R^{X1}$ and $R^{X2}$ has preferably 6 to 30 carbon atoms, more preferably 6 to 20 carbon atoms, and still more preferably 6 to 12 carbon atoms. Examples of the aryl group include phenyl, p-methylphenyl, biphenyl, naphthyl, anthranyl, phenanthryl, and fluorene.

As the heteroaryl group represented by $R^{X1}$ and $R^{X2}$, a monocyclic or fused ring is preferable, a monocyclic ring or a fused ring having a fused number of 2 to 8 is more preferable, and a monocyclic ring or a fused ring having a fused number of 2 to 4 is more preferable. The number of heteroatoms constituting the ring of the heteroaryl group is preferably 1 to 3. Preferred examples of the heteroatom constituting the ring of the heteroaryl group include a nitrogen atom, an oxygen atom, and a sulfur atom. The heteroaryl group is preferably a 5-membered ring or a 6-membered ring. The number of carbon atoms constituting the ring of the heteroaryl group is preferably 3 to 30, more preferably 3 to 18, and more preferably 3 to 12. Examples of the heteroaryl group include a pyridine ring, a piperidine ring, a furan ring group, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, and a thiadiazole ring.

$G^A$ and $G^B$ each independently represent a monovalent substituent. Here, examples of the monovalent substituent represented by $G^A$ and $G^B$ include a halogen atom, a cyano group, a nitro group, an alkyl group, an alkenyl group, an alkynyl group, an aryl group, a heteroaryl group, an aralkyl group, —$OR^{10}$, —$COR^{11}$, —$COOR^{12}$, —$OCOR^{13}$, —$NR^{14}R^{15}$, —$NHCOR^{16}$, —$CONR^{17}R^{18}$, —$NHCONR^{19}R^{20}$, —$NHCOOR^{21}$, —$SR^{22}$, —$SO_2R^{23}$, —$SO_2R^{24}$, —$NHSO_2R^{25}$, and —$SO_2NR^{26}R^{27}$.

Examples of the halogen atom represented by $G^A$ and $G^B$ include a fluorine atom, a chlorine atom, a bromine atom, and an iodine atom.

The details of the alkyl group, the alkenyl group, the alkynyl group, the aryl group, and the heteroaryl group represented by $G^A$ and $G^B$ are in the same range as described in the section of $R^{X1}$ and $R^{X2}$.

An alkyl moiety of the aralkyl group represented by $G^A$ and $G^B$ has the same definition as that for the alkyl group represented by $G^A$ and $G^B$. An aryl moiety of the aralkyl group has the same definition as that for the aryl group represented by $G^A$ and $G^B$. The aralkyl group has preferably 7 to 40 carbon atoms, more preferably 7 to 30 carbon atoms, and still more preferably 7 to 25 carbon atoms. Examples of the aralkyl group include a benzyl group, a phenylethyl group, a vinylbenzyl group, and a hydroxyphenylmethyl group.

The alkyl group, the alkenyl group, the alkynyl group, the aryl group, or the heteroaryl group represented by $R^{X1}$ and $R^{X2}$, and the alkyl group, the alkenyl group, the alkynyl group, the aryl group, the heteroaryl group, and the aralkyl group represented by $G^A$ and $G^B$ may have a substituent or may be unsubstituted.

Examples of the substituent which can be introduced include an alkyl group, an alkenyl group, an alkynyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, an aromatic heterocyclic thio group, a sulfonyl group, a sulfinyl group, an ureido group, a phosphoric acid amide group, a hydroxy group, a mercapto group, a halogen atom, a cyano group, a sulfo group, a carboxyl group, a nitro group, a hydroxamic acid group, a sulfino group, a hydrazino group, an imino group, and a silyl group. In addition, these substituents may be further substituted.

$R^{10}$ to $R^{27}$ each independently represent a hydrogen atom or a monovalent substituent. Example of the monovalent substituent represented by $R^{10}$ to $R^{27}$ include an aliphatic group, an aromatic group, and a heterocyclic group, and preferred example thereof include an alkyl group, an alkenyl group, an alkynyl group, an aryl group, a heteroaryl group, and an aralkyl group. The details of the alkyl group, the alkenyl group, the alkynyl group, the aryl group, the heteroaryl group, or the aralkyl group represented by $R^{10}$ to $R^{27}$ are in the same range as described in the section of $G^A$ and $G^B$.

In a case where $R^{12}$ of —$COOR^{12}$ represents a hydrogen atom (that is, a carboxyl group), the hydrogen atom may be dissociated (that is, a carbonate group) or may be in a state of a salt. Further, in a case where $R^{24}$ of —$SO_2OR^{24}$ represents a hydrogen atom (that is, a sulfo group), the hydrogen atom may be dissociated (that is, a sulfonate group) or may be in a state of a salt.

kA represents an integer of 0 to $n_A$, kB represents an integer of 0 to $n_B$, $n_A$ represents the largest integer of $G^A$ which may be substituted in the ring A, and $n_B$ represents the largest integer of $G^B$ which may be substituted in the ring B.

kA and kB each independently represent preferably 0 to 4, more preferably 0 to 2, and particularly preferably 0 or 1.

$X^A$ and $G^A$, and $X^B$ and $G^B$ may be respectively bonded to each other to form a ring, and in a case where a plurality of $G^A$'s and $G^B$'s are present, the plurality of $G^A$'s and the plurality of $G^B$'s may be respectively bonded to one another to form a ring structure.

The ring is preferably a 5-membered ring or a 6-membered ring. The ring may be monocyclic or multicyclic.

In a case where $X^A$ and $G^A$, $X^B$ and $G^B$, $G^A$'s, or $G^B$'s are respectively bonded to each other to form a ring, these may be directly bonded to form a ring or may be bonded through a divalent linking group selected from the group consisting of an alkylene group, —CO—, —O—, —NH—, —BR—, and a combination thereof to form a ring, and it is preferable that these are bonded through —BR— to form a ring. Here, R represents a hydrogen atom or a substituent. Here, examples of the substituent represented by R include the monovalent substituents described in the section of $G^A$ and $G^B$. Among these, an alkyl group or an aryl group is preferable.

[Near Infrared Absorbing Coloring Agent Represented by Formula (2)]

Examples of a preferred embodiment of the near infrared absorbing coloring agent represented by Formula (1) include a near infrared absorbing coloring agent represented by Formula (2). The near infrared absorbing coloring agent represented by Formula (2) has a characteristic of excellent heat resistance.

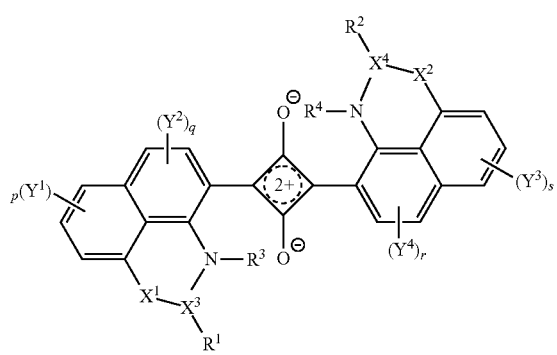

(2)

In Formula (2), $R^1$ and $R^2$ each independently represent a monovalent substituent, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each independently represent a carbon atom or a boron atom, $Y^1$, $Y^2$, $Y^3$, and $Y^4$ each independently represent a monovalent substituent, $Y^1$ and $Y^2$, and $Y^3$ and $Y^4$ may be respectively bonded to one another to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2.

$R^1$ and $R^2$ each independently represent a monovalent substituent. The monovalent substituent represented by $R^1$ and $R^2$ has the same definition as that for the monovalent substituent described in the section of $G^A$ and $G^B$.

$R^3$ and $R^4$ each independently represent a hydrogen atom or an alkyl group.

The alkyl group as $R^3$ and $R^4$ has, for example, 1 to 4 carbon atoms and preferably 1 or 2 carbon atoms. It is preferable that the alkyl group is linear or branched. Specific examples thereof include a methyl group, an ethyl group, a propyl group, an isopropyl group, a butyl group, and an isobutyl group.

$R^3$ and $R^4$ represent preferably a hydrogen atom, a methyl group, or an ethyl group, particularly preferably a hydrogen atom or a methyl group, and most preferably a hydrogen atom.

$X^1$ and $X^2$ each independently represent an oxygen atom or —N($R^5$)—. $X^1$ and $X^2$ may be the same as or different from each other, but it is preferable that $X^1$ and $X^2$ are the same as each other.

$R^5$ represents a hydrogen atom, an alkyl group, an aryl group, or a heteroaryl group. The alkyl group, the aryl group, and the heteroaryl group represented by $R^5$ may further have a substituent or may be unsubstituted.

The alkyl group as $R^5$ has preferably 1 to 20 carbon atoms, more preferably 1 to 10 carbon atoms, still more preferably 1 to 4 carbon atoms, and particularly preferably 1 or 2 carbon atoms. It is preferable that the alkyl group is linear or branched.

The aryl group as $R^5$ has preferably 6 to 20 carbon atoms and more preferably 6 to 12 carbon atoms.

The heteroaryl group as $R^5$ may be monocyclic or polycyclic. The number of heteroatoms constituting the ring of the heteroaryl group is preferably 1 to 3. Preferred examples of the heteroatom constituting the ring of the heteroaryl group include a nitrogen atom, an oxygen atom, and a sulfur atom. The number of carbon atoms constituting the ring of the heteroaryl group is preferably 3 to 30, more preferably 3 to 18, and more preferably 3 to 12.

$X^3$ and $X^4$ each independently represent a carbon atom or a boron atom.

$Y^1$, $Y^2$, $Y^3$, and $Y^4$ each independently represent a monovalent substituent. The monovalent substituent represented by $Y^1$, $Y^2$, $Y^3$, and $Y^4$ has the same definition as that for the monovalent substituent described in the section of $G^A$ and $G^B$.

$Y^1$ and $Y^2$, and $Y^3$ and $Y^4$ may be respectively bonded to each other to form a ring.

In a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring.

p and s each independently represent an integer of 0 to 3 and q and r each independently represent an integer of 0 to 2.

The molecular weight of the near infrared absorbing coloring agent represented by Formula (1) is preferably 100 to 2,000 and more preferably 150 to 1,000.

The near infrared absorbing coloring agent represented by Formula (1) and the near infrared absorbing coloring agent represented by Formula (2) may be a tautomer thereof. Examples of the tautomer can refer to the description in paragraph 0034 of WO2016-136783A.

Specific examples of the near infrared absorbing coloring agent represented by Formula (1) and the near infrared absorbing coloring agent represented by Formula (2) which is a preferable aspect of the near infrared absorbing coloring agent represented by Formula (1) include compounds having the following structures (exemplary compounds B-1 to B-40). However, the present disclosure is not limited to the following compounds.

B-1
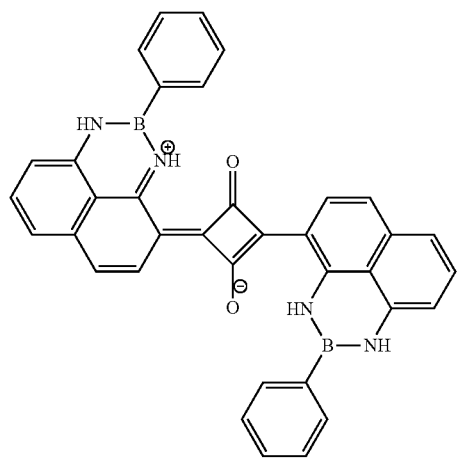
B-2
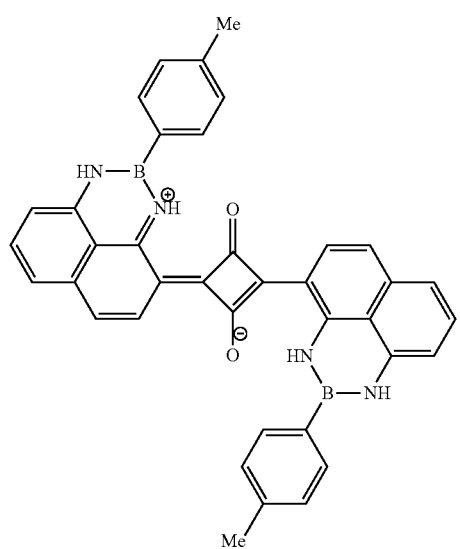
B-3
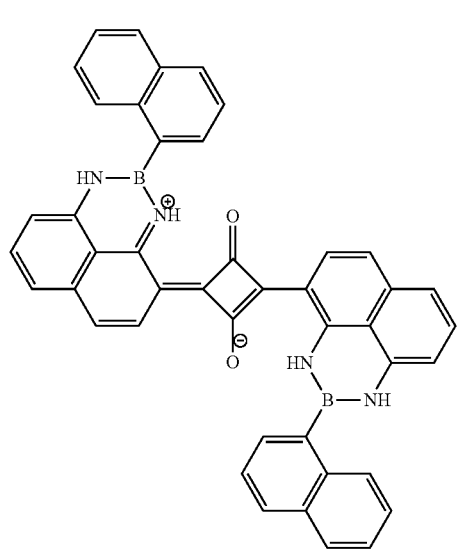
-continued
B-4
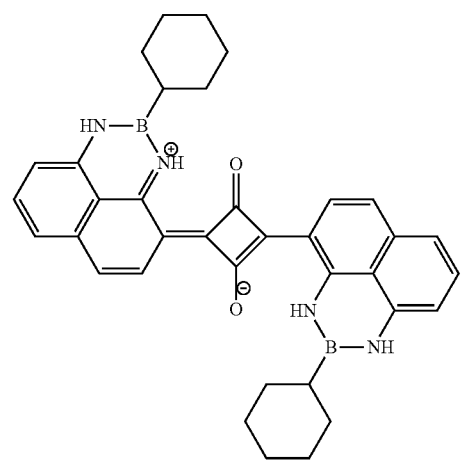
B-5
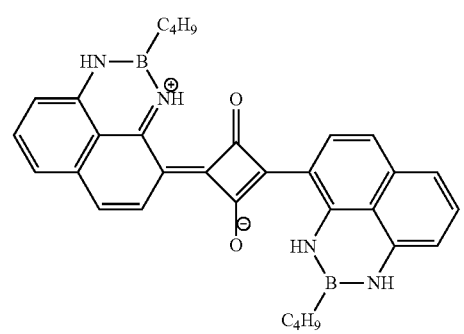
B-6
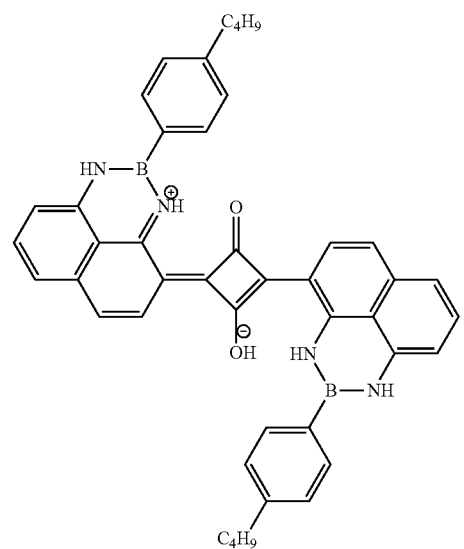

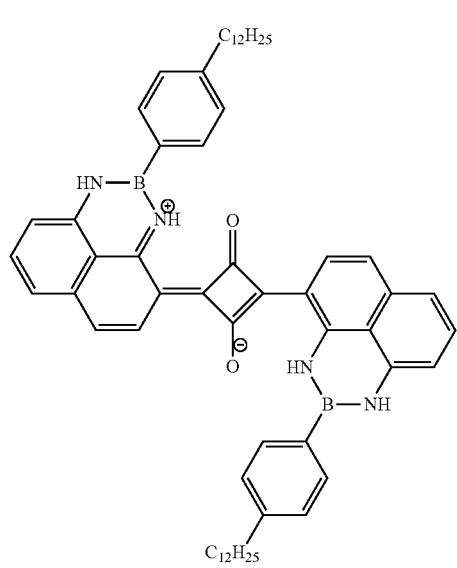
B-7
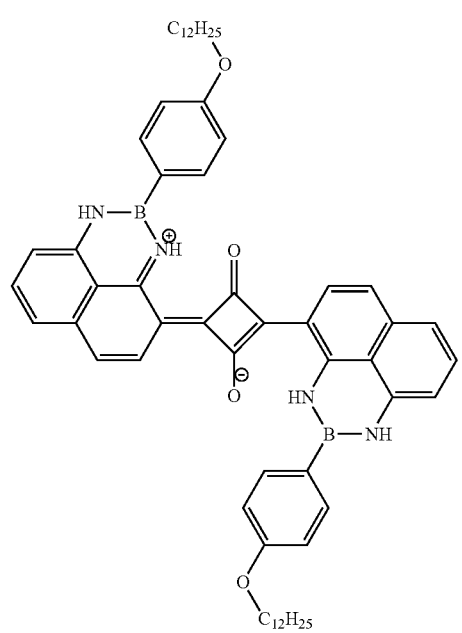
B-9
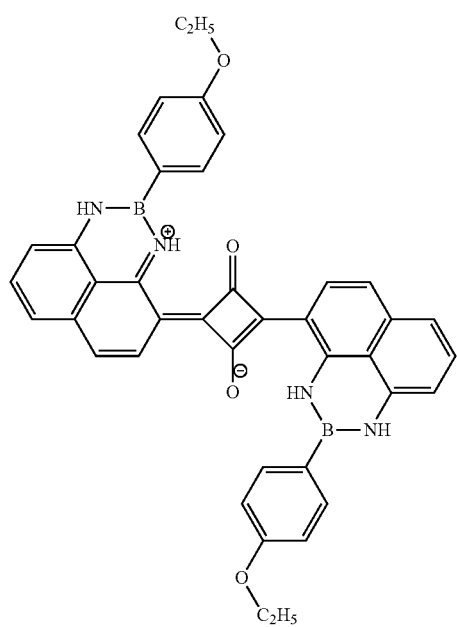
B-8
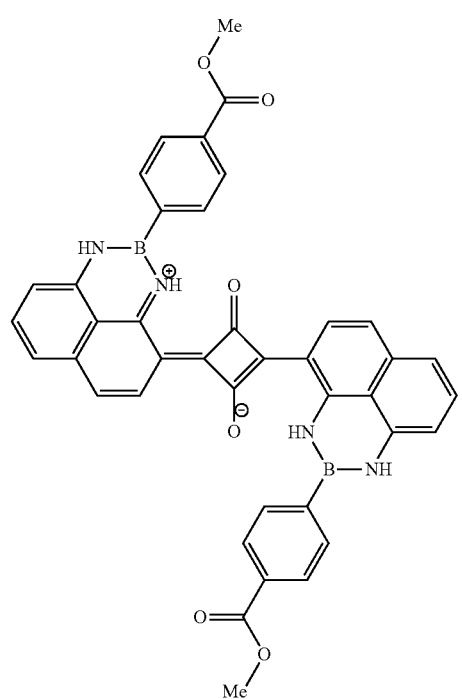
B-10

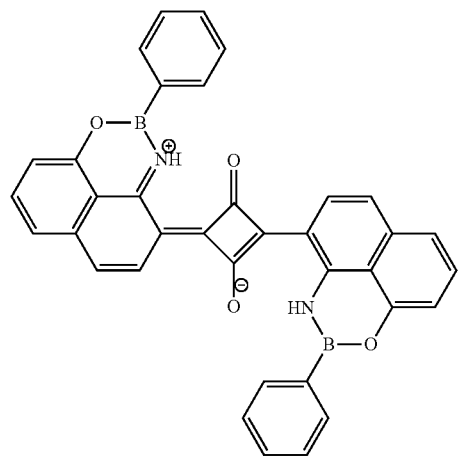
B-11
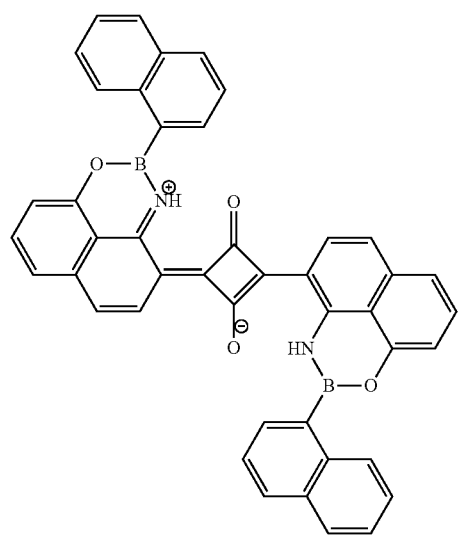
B-12
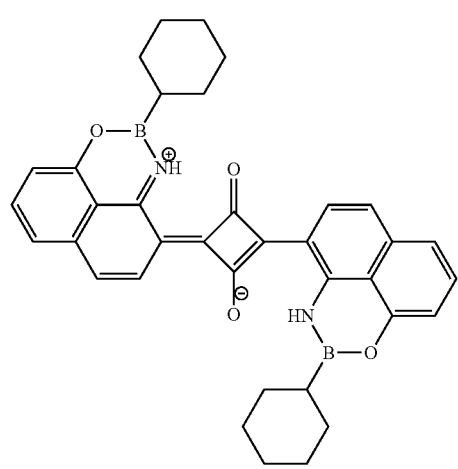
B-13
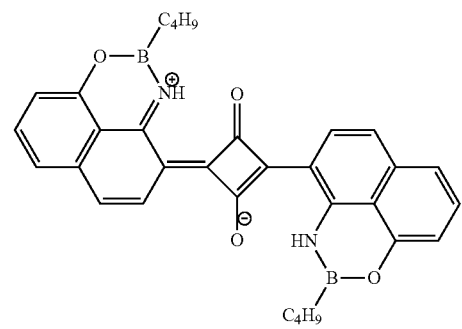
B-14
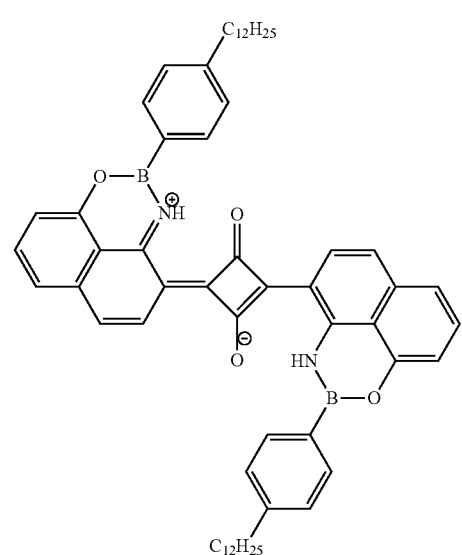
B-15
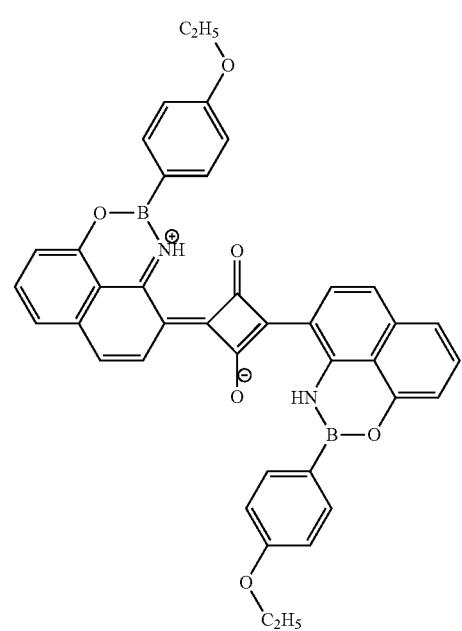
B-16

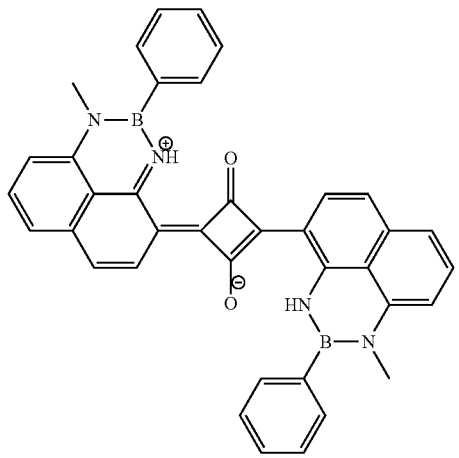
B-17
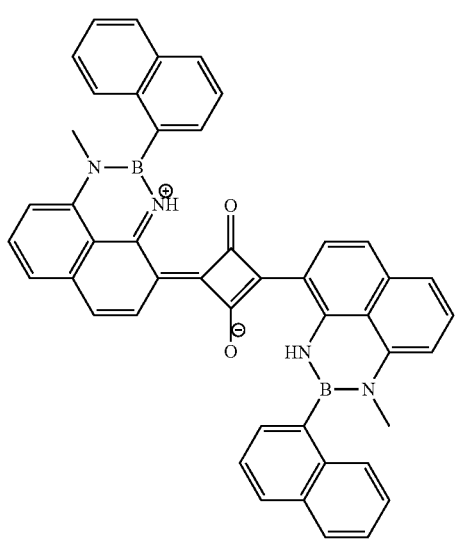
B-18
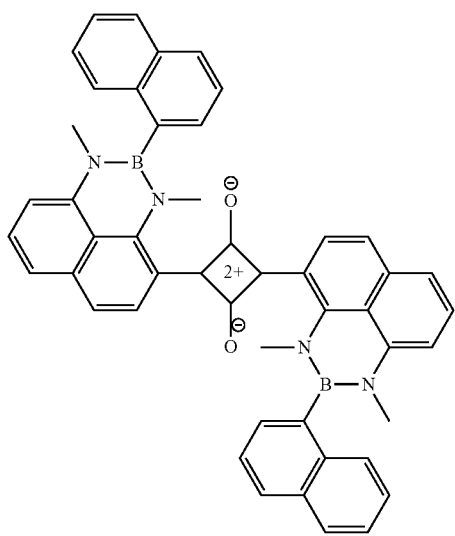
B-19
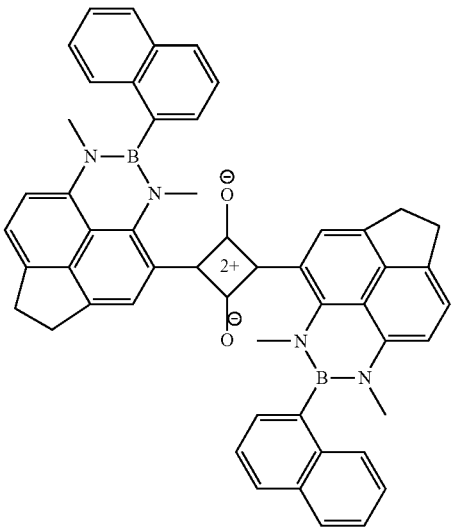
B-20
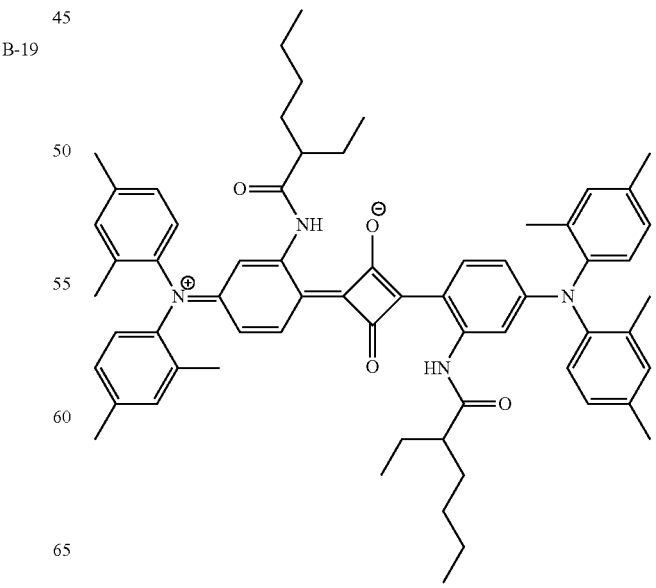
B-21
B-22

B-23
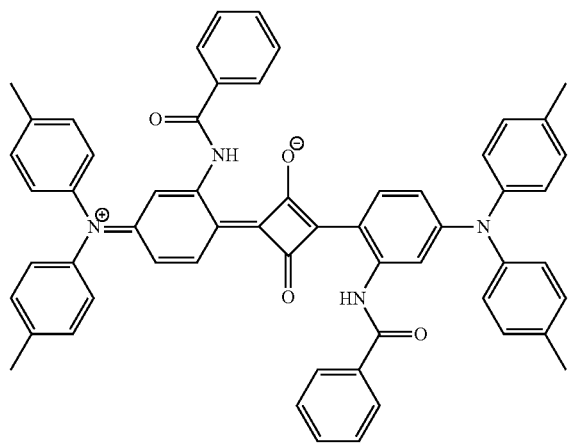
B-24
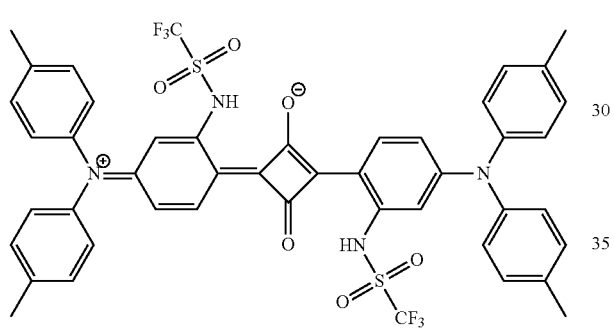
B-25
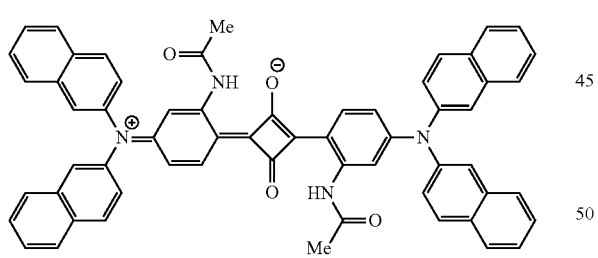
B-26
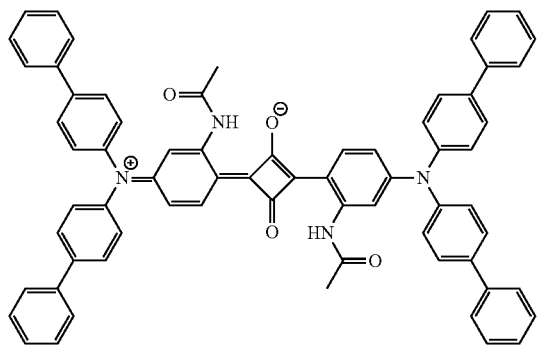
B-27
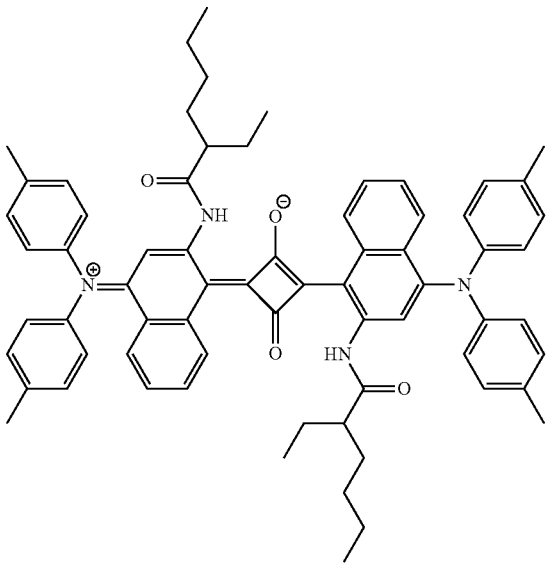
B-28
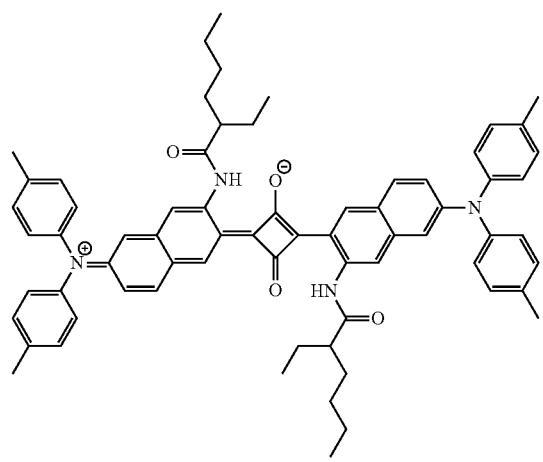
B-29
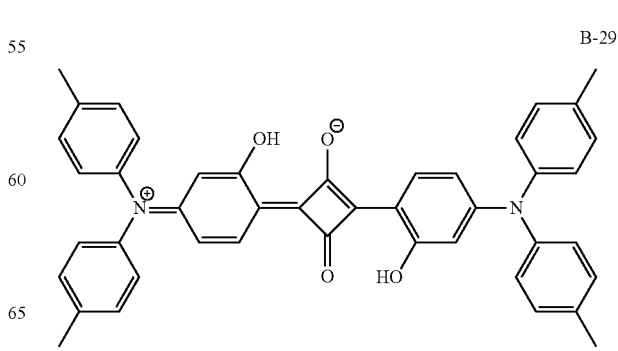

B-30
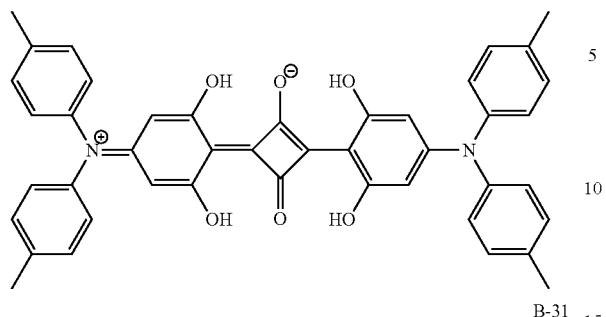
B-31
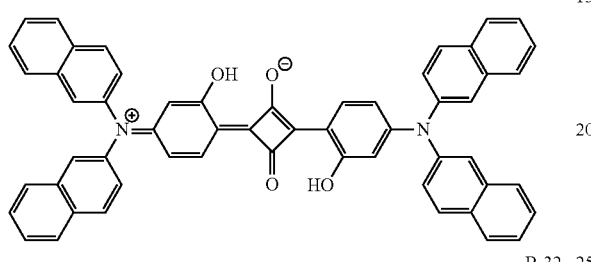
B-32
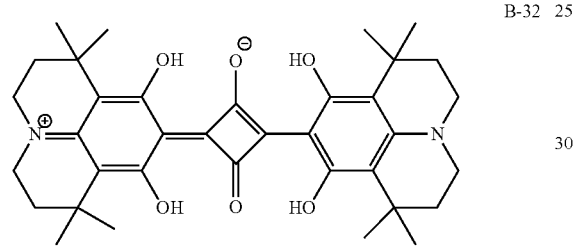
B-33
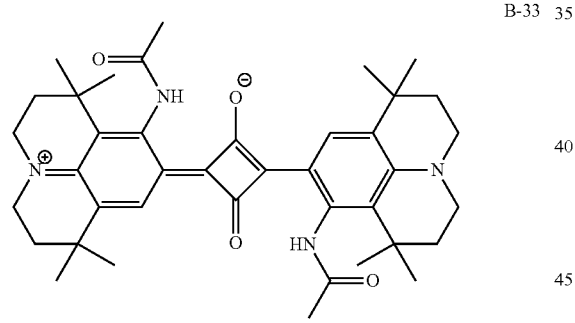
B-34
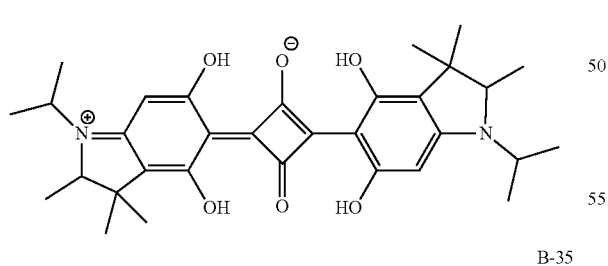
B-35
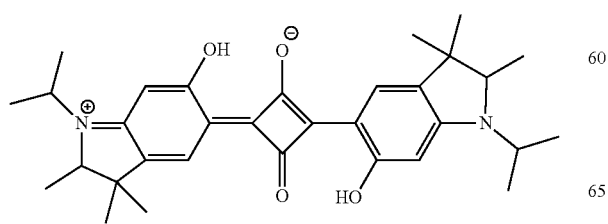
B-36
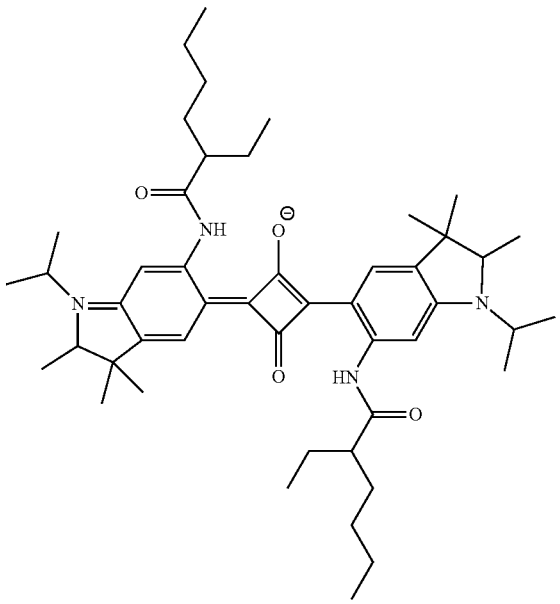
B-37
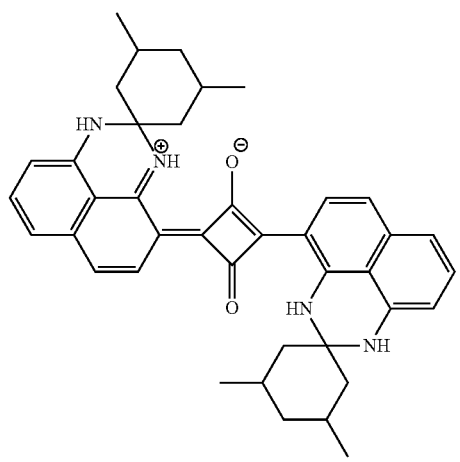
B-38
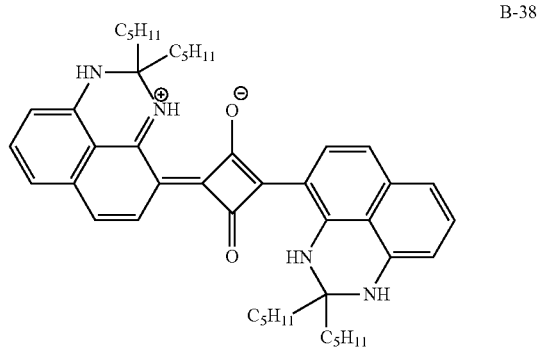

-continued

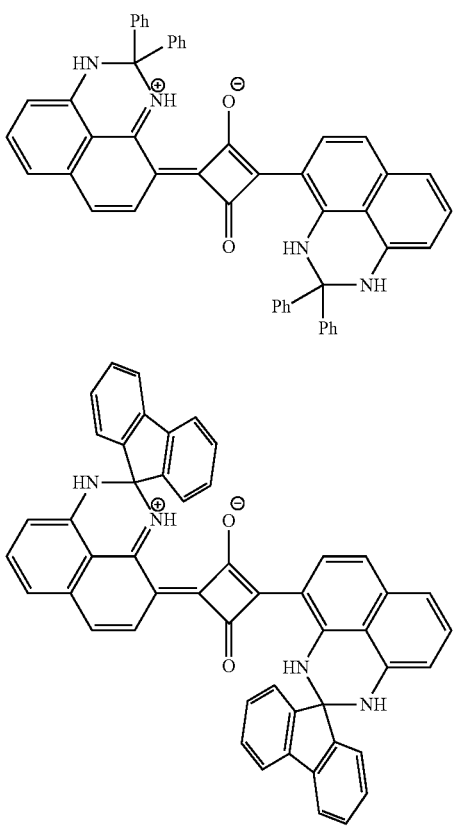

B-39

B-40

The resin composition may contain only one or two or more kinds of near infrared absorbing coloring agents.

The content of the near infrared absorbing coloring agent represented by Formula (1) and the near infared absorbing coloring agent represented by Formula (2) which is a and the near infrared absorbing coloring agent represented by Formula (2) which is a preferable aspect of the near infrared absorbing coloring agent represented by Formula (1) is preferably 0.001% by mass to 10% by mass, more preferably 0.01% by mass to 5% by mass, and still more preferably 0.05% by mass to 4.5% by mass with respect to the mass of the resin.

In a case where the content of the near infrared absorbing coloring agent in the resin composition is 10% by mass or less, cracks or disconnection which may occur in a molded article at the time of forming a resin molded article using the resin composition can be suppressed. Further, in a case where the content of the near infrared absorbing coloring agent is 0.001% by mass or greater, the near infrared absorbing coloring agent can exhibit desired infrared absorption capacity.

[Resin]

The resin composition according to the embodiment of the present disclosure contains a resin.

The resin is not particularly limited as long as the resin composition containing the near infrared absorbing coloring agent according to the embodiment of the present disclosure can be prepared using the resin. Examples of the resin in the present disclosure include typical synthetic resins. Among examples of the resins, from the viewpoint of easily performing molding, a thermoplastic resin is preferable. Examples of the thermoplastic resin include polyester, polystyrene, polyamide, polyurethane, polycarbonate, cellulose acetate, polyacryl, polyacetal, polypropylene, polyvinyl, polysulfone, polyimide, and polyolefin. Among these, at least one resin selected from the group consisting of polyester, polyamide, and polyurethane is preferable.

The resin can be used without limitation as long as the resin is appropriately selected depending on the applications of the resin composition and has desired characteristics such as strength and transparency suitable for the applications of the resin composition. Among the examples of the resin, from the viewpoint of the processability, the versatility, the durability, and the cost, it is preferable that the resin composition contains at least one selected from polyester, polyurethane, polyamide, polyolefin, polystyrene, or polycarbonate and more preferable that the resin composition contains at least one selected from polyester, polyamide, and polyurethane.

As the polyester, polyethylene terephthalate (PET) obtained by polycondensation of dimethyl terephthalate or terephthalic acid and ethylene glycol or polybutylene terephthalate (PBT) obtained by polycondensation of dimethyl terephthalate and butanediol is preferable. Particularly from the viewpoints of the production stability and the production cost, polyethylene terephthalate is more preferable.

Further, as the polyester, polylactic acid which is a biodegradable resin having excellent environmental suitability may be selected and used. In addition to typical poly-L-lactic acid and poly-D-lactic acid, a stereo complex or the like obtained by mixing these is also useful for the polylactic acid.

As the polyester, a commercially available product may be used.

Examples of the commercially available product of the polyester include "MITSUI PET (trade name)" Series (such as product number: MITSUI J125) (manufactured by Mitsui Chemicals, Inc.) and "VYLON" Series (manufactured by Toyobo Co., Ltd.) which are a polyol-polycarboxylic acid type polyester resin.

Examples of the polyester selected from copolymer resins including a polylactic acid resin and polylactic acid include a crystalline polylactic acid resin ("REVODE (registered trademark)" Series, manufactured by Zhejiang Hisun Biomaterials Co., Ltd., ratio of L body/D body=100/0 to 85/5, for example, product number: REVODE 101) and "LACEA (registered trademark)" Series (manufactured by Mitsui Chemicals, Inc.) produced by performing lactic acid fermentation on plat starch which is a polylactic acid resin.

As the polyamide, nylon (registered trademark) 66 obtained by using hexamethylenediamine and adipic acid or nylon 6 obtained by performing ring-opening polymerization on ε-caprolactam is preferable. From the viewpoint of the cost, nylon 6 is preferable.

As the polyamide, a commercially available product may be used.

Examples of the commercially available product of the polyamide include nylon 6 and "AMILAN (registered trademark)" Series (for example, product number; CM1017) which is nylon 66 (all manufactured by Toray Industries, Inc.); "LEONA (registered trademark)" Series which is a polyamide 66 resin (manufactured by Asahi Kasei Corporation); and "n-nylon" or "n,m-nylon" Series (manufactured by Teijin Limited).

The polyurethane is a copolymer obtained by reacting isocyanate with a polyol. As the isocyanate component, aromatic diisocyanate, aliphatic diisocyanate, alicyclic diisocyanate, or a mixture of these, for example, tolylene 2,4-diisocyanate, 4,4'-diphenylmethane diisocyanate, 1,6- hexane diisocyanate, or 1,4-cyclohexane diisocyanate can be used as a main component, and a tri- or higher functional polyisocyanate may be used as necessary. Further, as the polyol component, polyether polyol or polyester polyol may be used. As the polyether polyol, polyethylene glycol, polypropylene glycol, or polytetramethylene glycol can be used. As the polyester polyol, a reaction product of a diol such as ethylene glycol or propylene glycol and dihydrochloric acid such as adipic acid or sebacic acid; or a ring-opening polymer such as caprolactone can be used.

The polyolefin is a resin using a homopolymer such as ethylene, propylene, butane, or pentene or a copolymer of these as a main component.

Examples of the polyolefin resins include polyethylene resins, polypropylene resins, an ethylene-vinyl acetate copolymer, an ethylene-methyl acrylate copolymer, an ethylene-methyl methacrylate copolymer, an ethylene-ethyl acrylate copolymer, a propylene-vinyl acetate copolymer, a propylene-methyl acrylate copolymer, a propylene-methyl methacrylate copolymer, a propylene-ethyl acrylate copolymer, polybutene, a poly-3-methyl-1-butene copolymer, and a poly-4-methyl-1-pentene copolymer.

Among the examples of the polyolefin resins, polypropylene resins and polyethylene resins, which are inexpensive, have excellent processability, and are widely used for various industrial components and home appliances, are preferable.

Examples of the commercially available product of a polyolefin-based resin include each series of polypropylene-based resins "PRIME POLYPRO", "POLYFINE", and "PRIME TPO" (for example, product number: J-700GP and J-966HP) (all manufactured by Prime Polymer Co., Ltd.); each series of various polyethylene resins "HI-ZEX", "NEO-ZEX", ULTZEX", "MORETEC", and "EVOLUE" (for example, a high-density polyethylene resin, product number: 2200J) (all manufactured by Prime Polymer Co., Ltd.); and low-density polyethylene "PETROTHENE" Series (for example, product number: PETROTHENE 190) (all manufactured by Tosoh Corporation).

The polycarbonate is a resin typically produced by reacting dihydric phenol with a carbonate precursor. Examples of the dihydric phenol include 2,2-bis(4-hydroxyphenyl)propane (hereinafter, also referred to as bisphenol A), tetramethyl bisphenol A, tetrabromo bisphenol A, bis(4-hydroxyphenyl)p-isopropylbenzene, hydroquinone, resorcinol, 4,4'-dihydroxyphenol, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)ketone, 1,1-bis(4-hydroxyphenyl)ethane, and 1,1-bis(4-hydroxyphenyl)cyclohexane. Examples of the carbonate precursor include phosgene; diaryl carbonate such as diphenyl carbonate, and diahaloformate such as haloformate or dihaloformate of dihydric phenol.

Examples of a commercially available aromatic polycarbonate resin include "TARFLON" Series (manufactured by Idemitsu Kosan Co., Ltd.) and "PANLITE" Series (manufactured by Teijin Limited).

Examples of the polystyrene-based resin include polystyrene, poly(p-methylstyrene), poly(m-methylstyrene), poly (p-tert-butylstyrene), poly(p-chlorostyrene), poly(m-chlorostyrene), poly(p-fluorostyrene), hydrogenated polystyrene, and copolymers having these structural units.

These polystyrene-based resins may be used alone or in combination of two or more kinds thereof.

Examples of commercially available products of the polystyrene-based resin include "PSJ-POLYSTYRENE" Series (for example, product number: H8672) (manufactured by PS Japan Corporation) and "TOYO STYROL" Series (manufactured by Toyo-Styrene Co., Ltd.).

A commercially available resin can be used as the resin, or a resin formed by using a precursor monomer of a commercially available resin can also be used as the resin.

Further, the resin composition may contain only one or two or more kinds of resins. In a case where two or more kinds of resins are used for the resin composition, from the viewpoints of the compatibility and the moldability, it is preferable that resins whose glass transition temperatures and SP values are close to each other are used in combination.

(Other Components)

The resin composition according to the embodiment of the present disclosure may contain various additives in addition to the resin and the near infrared absorbing coloring agent as long as the effects of the present disclosure are not impaired.

(Colorant)

The resin composition according to the embodiment of the present disclosure may further include a colorant.

In a case where the resin composition contains a colorant, a desired hue can be imparted to the resin composition according to the embodiment of the present disclosure and the resin molded article prepared from the resin composition.

Examples of the colorant include dye compounds, pigment compounds, and dispersions thereof. The colorant may be an inorganic compound or an organic compound.

A pigment may be used as the colorant.

The pigment which can be used as the colorant will be described.

Examples of black pigments include organic black pigments such as aniline black, anthraquinone black, and perylene black; and inorganic black pigments such as carbon black, lamp black, graphite, fullerene, carbon nanotubes, magnetite, iron-titanium complex oxides, cobalt oxide, manganese dioxide, zinc sulfide, copper-chromium complex oxides, tin-antimony complex oxides, titanium-vanadium-antimony complex oxides, cobalt-nickel complex oxides, manganese-iron complex oxides, iron-cobalt-chromium complex oxides, copper-chromium complex oxides, iron-cobalt complex oxides, chromium-iron-nickel complex oxides, molybdenum disulfide, lower titanium oxide, titanium nitride, and chromium oxide.

As a chromatic pigment, a pigment such as a red pigment, a yellow pigment, an orange pigment, a purple pigment, a blue pigment, a green pigment, or a brown pigment is preferable.

Examples of the red pigment include a naphthol-based pigment, an azo-based pigment, a quinacridone-based pigment, an anthraquinone-based pigment, a perylene-based pigment, and a diketopyrrolopyrrole pigment. Examples of the yellow pigment include an organic pigment such as an azo-based pigment, an anthraquinone-based pigment, an isoindolinone-based pigment, a quinophthalone-based pigment, or a benzimidazolone-based pigment; and an inorganic pigment such as a titanium-nickel-antimony composite oxide or a zinc-iron composite oxide.

Examples of the orange pigment include a naphthol-based pigment, an azo-based pigment, a benzimidazolone-based pigment, a quinacridone-based pigment, and a diketopyrrolopyrrole-based pigment.

Examples of the purple pigment include an azo-based pigment, a rhodamine-based pigment, a carbazole-based pigment, a perylene-based pigment, and a quinacridone-based pigment.

Examples of the blue pigment include an organic pigment such as a phthalocyanine-based pigment; and an inorganic pigment such as a cobalt-aluminum composite oxide, a cobalt-aluminum-chromium composite oxide, or ultramarine blue.

Examples of the green pigment include an organic pigment such as a phthalocyanine-based pigment or an azo-based pigment; and an inorganic pigment such as a chromium oxide, a cobalt-chromium-aluminum composite oxide, or a cobalt-nickel-zinc composite oxide.

Examples of the brown pigment include an organic pigment such as an azo-based pigment or a benzimidazolone-based pigment; and an inorganic pigment such as an iron oxide or a titanium-chromium-antimony composite oxide.

The average primary particle diameter of the pigment used in the resin composition is preferably in a range of 0.01 μm to 5 μm and more preferably in a range of 0.01 μm to 3 μm. The average primary particle diameter of the pigment is an arithmetic mean value of an equivalent circle diameter which is in acquired in conformity with JIS Z8901-2006 "Test Powder and Test Particles" 5.4.4. particle size distribution (c) microscopy and is calculated by observing particles (20 to 50 particles) of an image obtained by observing a sample prepared according to a shaking method at a magnification of 50000 to 1000000 using a transmission electron microscope (manufactured by JEOL Ltd.).

A dye may be used as the colorant.

The dye which can be used as the colorant will be described.

Preferred examples of the dye include an acid dye, a direct dye, a basic dye, a salt-forming dye, an oil-soluble dye, a disperse dye, a reactive dye, a mordant dye, a vat dye, and a sulfur dye.

Examples of the acid dye include an anthraquinone-based acid dye, a phthalocyanine-based acid dye, a quinoline-based acid dye, an azine-based acid dye, an indigoid-based acid dye, a xanthene-based acid dye, and a triphenylmethane-based acid dye.

Examples of the direct dye include an azo-based direct dye, a thiazole-based direct dye, an anthraquinone-based direct dye, an oxazine-based direct dye, and a phthalocyanine-based direct dye.

Examples of the basic dye include an azo-based basic dye, an azine-based basic dye, an acridine-based basic dye, a methane-based basic dye, a thiazole-based basic dye, a thiazine-based basic dye, an oxazine-based basic dye, an anthraquinone-based basic dye, a xanthene-based basic dye, and a triarylmethane-based basic dye.

Examples of the oil-soluble dye include an anthraquinone-based oil-soluble dye, a phthalocyanine-based oil-soluble dye, a quinoline-based oil-soluble dye, an azine-based oil-soluble dye, an indigoid-based oil-soluble dye, a methine-based oil-soluble dye, an azo-based oil-soluble dye, an aminoketone-based oil-soluble dye, a xanthene-based oil-soluble dye, and a triphenylmethane-based oil-soluble dye.

Examples of the disperse dye include an anthraquinone-based disperse dye, a quinoline-based disperse dye, an indigoid-based disperse dye, a quinophthalone-based disperse dye, a methine-based disperse dye, an azo-based disperse dye, an aminoketone-based disperse dye, and a xanthene-based disperse dye.

Further, a salt-forming dye such as a salt-forming body of the acidic dye and a cationic compound; a salt-forming body of the basic dye and an anionic compound, or a salt-forming body of the acidic dye and the basic dye can be used. These dyes may be used alone or in combination of two or more kinds thereof.

In a case where the resin composition contains a colorant, the resin composition may contain only one or two or more kinds of colorants.

The content of the colorant in the case of being contained in the resin composition is preferably in a range of 0.0001% by mass to 20% by mass and more preferably in a range of 0.001% by mass to 10% by mass.

(Inorganic Filling Material)

An organic filling material can be further blended into the resin composition for the purpose of improving impact resistance, an antibacterial property, a gas barrier property, conductivity, a magnetic property, a piezoelectric property, a vibration-damping property, a sound insulation property, a sliding property, an electromagnetic wave absorbing property, flame retardancy, a dehydrating property, a deodorizing property, an anti-blocking property, an oil absorption property, a water absorption property, or moldability as necessary.

Examples of the inorganic filling material include carbon fibers, glass fibers, glass flakes, zeolite, mica, graphite, metal powder, ferrite, alumina, barium titanate, potassium titanate, barium sulfate, TEFLON (registered trademark) powder, talc, charcoal powder, carbon nanotubes (CNT), carbon micro-coil (CMC), antimony oxide, aluminum hydroxide, magnesium hydroxide, hydrotalcite, calcium oxide, silica, and calcium carbonate. It is preferable that the inorganic filling material is blended in an amount that does not degrade the transparency of the resin molded article.

Further, any known additives can be selected from a leveling agent, a pigment dispersant, an ultraviolet absorbing agent, an antioxidant, a viscosity modifier, a light stabilizer, a heat-resistance stabilizer, a metal deactivator, a peroxide decomposer, a processing stabilizer, a nucleating agent, a crystallization accelerator, a crystallization retarder, an antigelling agent, a filler, a reinforcing agent, a plasticizer, a lubricant, a flame retardant, a rust inhibitor, a fluorescent brightener, a fluidity modifier, and an antistatic agent and then can be blended into the resin composition according to the embodiment of the present disclosure.

[Method of Preparing Resin Composition]

A method of preparing the resin composition according to the embodiment of the present disclosure is not particularly limited. For example, a resin composition may be obtained by directly kneading a near infrared absorbing coloring agent into a master batch or a resin pellet serving as a resin raw material in order to allow the resin composition to contain a near infrared absorbing coloring agent, mixing the resultant, and performing melt molding thereon. Alternatively, the resin composition may be obtained by adhering a near infrared absorbing coloring agent to the resin according to a method of performing coating or immersion.

Among examples of the resin composition, since the near infrared absorbing coloring agent is unlikely to be desorbed from the surface of the resin and the durability and persistence of the infrared absorption capacity are excellent, the resin composition obtained by directly kneading the near infrared absorbing coloring agent into the resin, performing kneading, and performing melt molding is preferable.

It is preferable that a molded article is formed after the near infrared absorbing coloring agent is mixed with the resin and uniformly dispersed at the stage of forming the resin molded article. Further, the near infrared absorbing coloring agent is mixed with the resin according to a method of heating and kneading the resin and the near infrared absorbing coloring agent or a method of stirring and mixing the resin, the near infrared absorbing coloring agent, and a solvent.

[Resin Molded Article]

A resin molded article according to the embodiment of the present disclosure includes a near infrared absorbing coloring agent represented by Formula (1) and a resin. The near infrared absorbing coloring agent represented by Formula (1) includes the near infrared absorbing coloring agent represented by Formula (2).

The resin molded article according to the embodiment of the present disclosure may further include a colorant.

Here, the "near infrared absorbing coloring agent represented by Formula (1)", the "near infrared absorbing coloring agent represented by Formula (2)", the "resin", and the "colorant" are as described in the section of "<Resin composition>"

The shape and the applications of the resin molded article are not particularly limited and the resin composition can be processed to various molded articles.

Specific examples of the forms of the resin molded articles include the forms of resin molded articles used for various applications, for example, resin films; synthetic fibers, resin containers such as bottles, containers for cosmetics, and containers for food; resin plates; lenses; toners; various home appliances including typical accessories and exterior components such as electronic devices; house construction material components such as interior materials and exterior materials; and interior and exterior components such as aircrafts and vehicles.

Further, examples of the resin molded articles include resin pellets or granular resins which can be used as the raw materials of various resin molded articles described above.

Among the examples of the resin molded articles, in a case where the resin molded article according to the embodiment of the present disclosure is used for resin films or synthetic fibers, near infrared-absorbing resin films or near infrared-absorbing synthetic fibers are obtained and the effects of the present disclosure are significant because the infrared absorption capacity is maintained for a long time without changing the tint of the resin so that the resin molded article which has been heated and molded maintains excellent infrared absorption capacity.

Further, the resin molded article according to the embodiment of the present disclosure can be suitably applied to resin pellets or resin particles serving as resin raw materials provided for heating and molding.

A method of producing the resin molded article is not particularly limited, and a known method of molding a resin can be appropriately employed.

For example, the resin molded article can be obtained by mixing a predetermined content of the near infrared absorbing coloring agent represented by Formula (1) with a predetermined content of a resin chip, adding other optional components such as the colorant as necessary, mixing or melt-kneading the mixture, and the obtained resin composition can be molded using an optional method.

Among examples of the production method, it is preferable to employ the following method of producing a resin molded article.

[Method of Producing Resin Molded Article]

A method of producing the resin molded article according to the embodiment of the present disclosure includes a step of kneading the near infrared absorbing coloring agent represented by Formula (1) and a resin to obtain a resin kneaded material, and a step of molding the obtained resin kneaded material.

The near infrared absorbing coloring agent represented by Formula (1) includes the near infrared absorbing coloring agent represented by Formula (2).

A colorant may be further kneaded in the resin kneaded material.

Here, the "near infrared absorbing coloring agent represented by Formula (1)", the "near infrared absorbing coloring agent represented by Formula (2)", the "resin", and the "colorant" are as described in the section of "<Resin composition>"

(Step of Kneading Near Infrared Absorbing Coloring Agent Represented by Formula (1) and Resin to Obtain Resin Kneaded Material)

A resin kneaded material can be obtained by mixing a predetermined content of the near infrared absorbing coloring agent represented by Formula (1) with a predetermined content of a resin chip (for example, a chip of a resin selected from polyester such as polyethylene terephthalate and polyamide such as nylon 6), adding other optional components such as the colorant as necessary, and performing melt kneading.

In the step of the kneading to obtain the resin kneaded material, the near infrared absorbing coloring agent represented by Formula (1) is mixed with the resin such that the content of the near infrared absorbing coloring agent is preferably 0.001% by mass to 10% by mass, more preferably 0.01% by mass to 5% by mass, and still more preferably 0.05% by mass to 4.5% by mass with respect to the mass of the resin.

In a case where the content of the near infrared absorbing coloring agent in the resin kneaded material is 10% by mass or less, cracks or disconnection which may occur at the time of forming a resin molded article using the resin kneaded material can be suppressed. Further, in a case where the content of the near infrared absorbing coloring agent is 0.001% by mass or greater, the near infrared absorbing coloring agent can exhibit desired infrared absorption capacity.

The obtained resin kneaded material may be prepared to have a pellet shape, a powder shape, a granular shape, or a bead shape to obtain a solid-state resin composition containing a near infrared absorbing coloring agent and a resin.

The kneading can be carried out using a known device such as a Banbury mixer, a twin screw extruder, a single screw extrude, a rotor type twin screw kneader, or a kneader.

(Step of Molding Obtained Resin Kneaded Material)

The obtained solid-state resin composition is melted and then melt-kneaded to obtain a resin kneaded material using a melt extruder, the obtained resin kneaded material is allowed to pass through a gear pump or a filter from the melt extruder, and various molded articles can be produced as desired.

For example, in a case where a resin film is formed as a resin molded article, an unstretched resin film can be obtained by extruding a melt kneaded material to a cooling roll through a die and cooling and solidifying the kneaded material.

Examples of the film molding which can be used for forming a resin film include T-die film molding, inflation molding, and calendar molding.

Further, synthetic fibers can be obtained by extruding the melt kneaded material in the form of fibers from a nozzle (spinneret) with a plurality of thin holes to be spun after the melt kneaded material is allowed to pass through the gear pump or filter from the melt extruder.

(Other Production Methods)

As the molding method for obtaining the resin molded article using a solid-state resin composition as a raw material, various molding methods such as the film formation and the spinning of a synthetic resin described above, injection molding, vacuum molding, extrusion molding, blow molding (such as biaxial stretch blow molding or direct blow molding), and rotational molding can be employed.

Among the examples of the molding method, molding methods such as injection molding, film molding, and blow molding are preferable as the molding method which can be employed for producing the resin molded article.

In a case where the resin composition is applied to the molding method without forming a resin kneaded material, the resin composition can be mixed using a known mixer such as a Henschel mixer, a tumbler, a disper, a kneader, a roll mill, a super mixer, a vertical granulator, a high speed mixer, a far matrix, a ball mill, a steel mill, a sand mill, a vibration mill, or an attritor.

The resin molded article containing the near infrared absorbing coloring agent and the resin which has been obtained in the above-described manner is expected to be applied to authenticity determination using the characteristic of showing absorption in an invisible infrared region. In addition, the resin molded article is considered to be applied to yarns or fibers having a high heat-storing effect and a high temperature-retaining effect using the photothermal conversion property of the near infrared absorbing coloring agent.

Further, since the near infrared absorbing coloring agent contained in the resin composition according to the embodiment of the present disclosure has excellent invisibility, the transparency of the original resin of the obtained resin molded article is not impaired. In a case where the resin composition further contains a colorant, a molded article with excellent designability, a molded article with an excellent tint, synthetic fibers, and the like can be obtained without impairing the tint of the colorant.

EXAMPLES

Hereinafter, the present disclosure will be described in more detail based on examples, but the present disclosure is not limited to these examples.

Hereinafter, raw materials used in the examples will be described.

[Near Infrared Absorbing Coloring Agent of Examples]

The near infrared absorbing coloring agent was used by being selected from the exemplary compounds disclosed in the section of the "near infrared absorbing coloring agent represented by Formula (1)" described above and then displayed in Tables 1 and 2 using the compound numbers.

[Near Infrared Absorbing Coloring Agent of Comparative Examples]

(D-1): Kayasorb (registered trademark) IRG-023 (diimmonium-based coloring agent, manufactured by Nippon Kayaku Co., Ltd.)

(D-2): FDN-004 (phthalocyanine, manufactured by Yamada Chemical Co., Ltd.)

[Additive]

(Pigment)

(C-1): black inorganic pigment (carbon black C. I. Pigment Black 7, average primary particle diameter: 0.024 μm)

(C-2): blue organic pigment (b type phthalocyanine blue C. I. Pigment Blue 15:3, average primary particle diameter: 0.1 μm)

(C-3): red organic pigment (quinacridone-based red C. I. Pigment Red 122, average primary particle diameter: 0.12 μm)

(C-4): yellow organic pigment (disazo-based yellow C. I. Pigment Yellow 180, average primary particle diameter: 0.23 μm)

(C-5): blue inorganic pigment (ultramarine blue C. I. Pigment Blue 29, average primary particle diameter: 2 μm)

(C-6): golden pearl pigment (particle diameter of 5 μm to 25 μm, titanium oxide coating amount of 48%)

Example 1

A polyethylene terephthalate chip having an intrinsic viscosity of 0.78 dl/g as a resin and the near specific infrared absorbing coloring agent (B-1) were put into a twin-screw kneader having a diameter of 50 mm such that the content of the polyethylene terephthalate chip and the content of the near infrared absorbing coloring agent were set to the values listed in Table 1, and the mixture was melt-kneaded at 280° C. and extruded.

The extruded melt was allowed to pass through a gear pump and a filter (pore diameter of 20 μm) and extruded to a cooling roll at 20° C. from a die to obtain an unstretched film (also referred to as an amorphous film). Further, the extruded melt was brought into close contact with the cooling roll using an electrostatic application method and cooled to form an unstretched film.

Next, the unstretched film extruded and solidified on the cooling roll was sequentially and biaxially stretched according to the following method, thereby obtaining a polyethylene terephthalate film having a thickness of 200 μm as a resin molded article.

<Stretching Method>

(a) Longitudinal Stretching

The unstretched film was stretched in the longitudinal direction (transport direction) by allowing the film to pass through a space between two pairs of nip rolls with different peripheral speeds. Further, the film was stretched by setting the preheating temperature to 90° C., the stretching temperature to 90° C., the stretching rate to 3.5 times, and the stretching speed to 3000%/sec.

(b) Horizontal Stretching

The longitudinally stretched film was horizontally stretched under the following conditions using a tenter.

—Conditions—

Preheating temperature: 100° C.

Stretching temperature: 110° C.

Stretching rate: 4.2 times

Stretching speed: 70%/sec (c) Heat Fixation and Heat Relaxation

Next, the stretched film after the longitudinal stretching and the horizontal stretching was heat-fixed under the following conditions. Further, after the heat fixation, the film was heat-relaxed by reducing the tenter width under the following conditions.

—Heat Fixation Conditions—

Heat fixation temperature: 198° C.

Heat fixation time: 2 seconds

—Heat Relaxation Conditions—

Heat relaxation temperature: 195° C.

Heat relaxation rate: 5%

Examples 2 to 12 and Comparative Examples 1 to 4

Each polyethylene terephthalate film having a thickness of 200 μm was obtained in the same manner as in Example 1 except that the kind of the near infrared absorbing coloring agent and the content thereof, and an optional additive and the content thereof were changed as listed in Table 1.

Example 13

A nylon 6 chip serving as polyamide and having an intrinsic viscosity of 3.05 dl/g as a resin and the near infrared absorbing coloring agent (B-1) were mixed such that the contents thereof were set to the values listed in Table 2, added to a twin-screw kneader having a diameter of 50 mm, melted at 280° C., and extruded.

The extruded melt was allowed to pass through a gear pump and a filter (pore diameter of 20 μm) and extruded to a cooling roll at 20° C. from a die, thereby obtaining an unstretched (amorphous) film.

Further, the extruded melt was brought into close contact with the cooling roll using an electrostatic application method so that a film was molded.

Next, the unstretched film sequentially biaxially stretched according to the same method as in Example 1, thereby obtaining a polyamide (nylon 6) film having a thickness of 180 μm as a resin molded article.

Examples 14 to 24 and Comparative Examples 5 to 8

Each polyamide (nylon 6) film having a thickness of 180 μm was obtained in the same manner as in Example 13 except that the kind of the near infrared absorbing coloring agent and the content thereof, and an optional additive and the content thereof were changed as listed in Table 2.

[Evaluation of Resin Molded Article]

The following items were evaluated on each of the obtained films serving as resin molded articles.

In addition, in the evaluation of each item, reference films which were prepared according to the same procedures as in the examples and the comparative examples except that the near infrared absorbing coloring agent was not added were used for comparison with the respectively corresponding films of the examples and the comparative examples.

(1. Change in Tint)

The ΔEab value of each film of the examples and the comparative examples was measured using a colorimeter MCPD-1000 (manufactured by Otsuka electronics Co., Ltd.) and the evaluation was performed based on the following standards. Further, the ΔEab value is a value acquired using the following color difference formula (The Color Science Handbook (1985), new edition, p. 266, edited by The Color Science Association of Japan) based on the CIE (Commission Internationale de l'Eclairage) 1976 (L*, a*, b*) space color system.

In a case where the ΔEab value is small, this indicates that the amount of color change in the film resulting from containing the near infrared absorbing coloring agent is small and the invisibility of the near infrared absorbing coloring agent contained in the resin molded article is excellent.

In the following evaluation standards, it is determined that the change in tint is suppressed and the invisibility of the near infrared absorbing coloring agent is practically sufficient in the cases of the rank A or the rank B. The results are listed in Tables 1 and 2.

$$\Delta Eab = \{(\Delta L^*)^2 + (\Delta a^*)^2 + (\Delta b^*)^2\}^{1/2}$$

<Evaluation Standards>
A: ΔEab value<3
B: 3≤ΔEab value<20
C: 20≤ΔEab value (2. Change in Near Infrared Absorption Amount)

The absorbance of the maximum absorption wavelength in a near infrared region of 730 nm to 1200 nm was measured with respect to each film of the examples and the comparative examples using a spectrophotometer UV-3100 (manufactured by Shimadzu Corporation), and then the change rate was evaluated with respect to each reference film. In a case where a difference in absorbance is large, this indicates that the near infrared absorbing coloring agent remains.

In the following evaluation standards, it is determined that a practically sufficient amount of near infrared absorbing coloring agent remains in the cases of the rank A or the rank B. The results are listed in Tables 1 and 2.

<Evaluation Standards>
A: Change rate>5%
B: 0.1%<change rate≤5%
C: Change rate≤0.1%

(3. Heat Storage Property)

Each film of the examples and the comparative examples as a sample was placed on a styrofoam sample stand in an environment of 23° C. at 45% RH, and a thermocouple temperature sensor was inserted into a space between the sample and the sample stand. Next, the sample surface was irradiated with light using a photo lamp "PRF-500WB" (manufactured by Panasonic Corporation) for 10 minutes from a distance of 30 cm above the sample surface (the surface of the resin film), and the temperature of the sample was measured using the thermocouple temperature sensor. In the same manner, the temperature of each reference film corresponding to each film of the examples and the comparative examples was measured, and a difference in temperature between the films was acquired.

In a case where the temperature is high, this indicates that the heat storage property from the near infrared absorbing coloring agent, in other words, the infrared absorption capacity is excellent. The results are listed in Tables 1 and 2.

TABLE 1

|  | Resin composition | | | | Performance evaluation | | |
| --- | --- | --- | --- | --- | --- | --- | --- |
|  | Near infrared absorbing coloring agent | Content (% by mass) | Additive | Content (% by mass) | Change in tint | Change in infrared absorption amount | Heat storage property |
| Example 1 | B-1 | 0.3 | — | — | A | A | 4.9° C. |
| Example 2 | B-3 | 4.3 | C-1 | 0.1 | A | A | 7.9° C. |
| Example 3 | B-4 | 0.1 | C-6 | 0.1 | A | A | 4.2° C. |
| Example 4 | B-1 | 0.05 | — | — | A | A | 3.5° C. |
| Example 5 | B-1 | 3.5 | — | — | A | A | 6.5° C. |

TABLE 1-continued

|  | Resin composition | | | | Performance evaluation | | |
| --- | --- | --- | --- | --- | --- | --- | --- |
|  | Near infrared absorbing coloring agent | Content (% by mass) | Additive | Content (% by mass) | Change in tint | Change in infrared absorption amount | Heat storage property |
| Example 6 | B-11 | 0.1 | — | — | A | A | 4.1° C. |
| Example 7 | B-21 | 0.2 | C-3 | 0.1 | B | B | 4.4° C. |
| Example 8 | B-25 | 0.3 | C-2 | 0.1 | B | B | 4.8° C. |
| Example 9 | B-29 | 1 | — | — | B | B | 5.4° C. |
| Example 10 | B-35 | 1.1 | — | — | B | B | 5.5° C. |
| Example 11 | B-38 | 0.5 | — | — | A | A | 5.1° C. |
| Example 12 | B-8 | 1 | C-3 | 0.2 | A | A | 5.8° C. |
|  | B-38 | 1 | | | | | |
| Comparative Example 1 | D-1 | 0.5 | — | — | C | C | 0.1° C. |
| Comparative Example 2 | D-1 | 0.3 | C-2 | 0.1 | C | C | 0.2° C. |
| Comparative Example 3 | D-2 | 0.5 | — | — | C | B | 2.3° C. |
| Comparative Example 4 | D-2 | 0.3 | C-2 | 0.1 | C | B | 3.5° C. |

TABLE 2

|  | Resin composition | | | | Performance evaluation | | |
| --- | --- | --- | --- | --- | --- | --- | --- |
|  | Near infrared absorbing coloring agent | Content (% by mass) | Additive | Content (% by mass) | Change in tint | Change in infrared absorption amount | Heat storage property |
| Example 13 | B-1 | 0.3 | — | — | A | A | 4.8° C. |
| Example 14 | B-3 | 4.3 | C-1 | 0.1 | A | A | 7.8° C. |
| Example 15 | B-4 | 0.1 | C-6 | 0.1 | A | A | 4.2° C. |
| Example 16 | B-1 | 0.05 | — | — | A | A | 3.6° C. |
| Example 17 | B-1 | 3.5 | — | — | A | A | 6.4° C. |
| Example 18 | B-11 | 0.1 | — | — | A | A | 4.0° C. |
| Example 19 | B-21 | 0.2 | C-3 | 0.1 | B | B | 4.4° C. |
| Example 20 | B-25 | 0.3 | C-2 | 0.1 | B | B | 4.7° C. |
| Example 21 | B-29 | 1 | — | — | B | B | 5.2° C. |
| Example 22 | B-35 | 1.1 | — | — | B | B | 5.5° C. |
| Example 23 | B-38 | 0.5 | — | — | A | A | 5.0° C. |
| Example 24 | B-8 | 1 | C-3 | 0.2 | A | A | 5.8° C. |
|  | B-38 | 1 | | | | | |
| Comparative Example 5 | D-1 | 0.5 | — | — | C | C | 0.1° C. |
| Comparative Example 6 | D-1 | 0.3 | C-2 | 0.1 | C | C | 0.2° C. |
| Comparative Example 7 | D-2 | 0.5 | — | — | C | B | 2.4° C. |
| Comparative Example 8 | D-2 | 0.3 | C-2 | 0.1 | C | B | 3.3° C. |

As shown in the results of Examples 1 to 24, it was found that a resin molded article which does not impair the tint of the resin and the colorant included in the resin, retains a sufficient amount of the near infrared absorbing coloring agent after being heated, melted, and molded, and has excellent infrared absorption capacity can be obtained by using the resin composition containing the near infrared absorbing coloring agent represented by Formula (1).

Meanwhile, in the resin molded articles of Comparative Examples 1 to 8 which were obtained by using a near infrared absorbing coloring agent other than the near infrared absorbing coloring agent according to the embodiment of the present disclosure, it was shown that the change in tint and the residual amount of the near infrared absorbing coloring agent were insufficient, and the infrared absorption capacity was degraded.

The entirety of the disclosure of JP2017-113819 filed on Jun. 8, 2017 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A resin composition comprising:
a near infrared absorbing coloring agent represented by Formula (2); and
a resin,

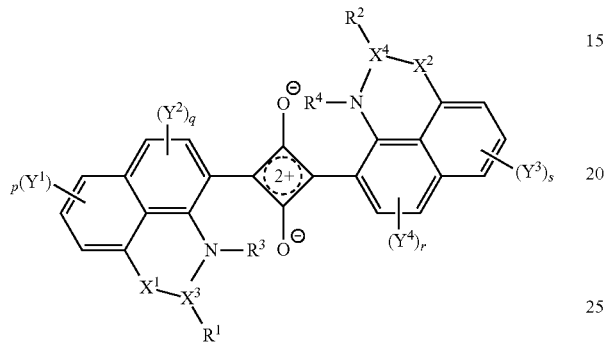

in Formula (2), $R^1$ and $R^2$ each independently represent a phenyl group or a substituted phenyl group, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each represent a boron atom, $Y^1$, $Y^2$, $Y^3$, and $Y^4$ each independently represent a monovalent substituent, $Y^1$ and $Y^2$, and $Y^3$ and $Y^4$ may be respectively bonded to each other to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2, wherein a content of the near infrared absorbing coloring agent represented by Formula (2) is 3.5% by mass to 5% by mass with respect to a mass of the resin.

2. The resin composition according to claim 1,
wherein the resin is at least one resin selected from the group consisting of polyester, polyamide, and polyurethane.

3. The resin composition according to claim 1, further comprising:
a colorant.

4. A resin molded article comprising:
a near infrared absorbing coloring agent represented by Formula (2); and
a resin,

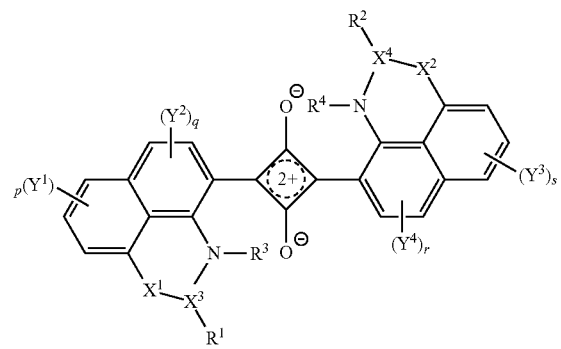

in Formula (2), $R^1$ and $R^2$ each independently represent a phenyl group or a substituted phenyl group, $R^3$ and $R^4$ each independently represent a hydrogen atom or an alkyl group, $X^1$ and $X^2$ each independently represent an oxygen atom or —N($R^5$)—, $R^5$ represents a hydrogen atom, an alkyl group, an aryl group, or a heteroaryl group, $X^3$ and $X^4$ each represent a boron atom, $Y^1$, $Y^2$, $Y^3$, and $Y^4$ each independently represent a monovalent substituent, $Y^1$ and $Y^2$, and $Y^3$ and $Y^4$ may be respectively bonded to each other to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2, wherein a content of the near infrared absorbing coloring agent represented by Formula (2) is 3.5% by mass to 5% by mass with respect to a mass of the resin.

5. The resin molded article according to claim 4,
wherein the resin is at least one resin selected from the group consisting of polyester, polyamide, and polyurethane.

6. The resin molded article according to claim 4, further comprising:
a colorant.

7. A method of producing a resin molded article, comprising:
a step of kneading a near infrared absorbing coloring agent represented by Formula (2) and a resin to obtain a resin kneaded material, wherein the near infrared absorbing coloring agent represented by Formula (2) is mixed in an amount of 3.5% by mass to 5% by mass with respect to a mass of the resin; and a step of molding the obtained resin kneaded material,

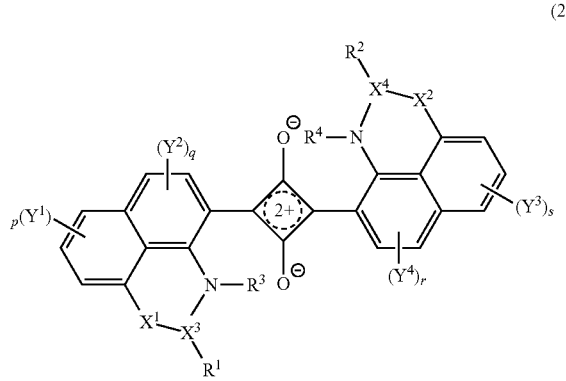

(2)

in Formula (2), $R^1$ and $R^2$ each independently represent a phenyl group or a substituted phenyl group, $R^3$ and $R^4$ each independently represent a hydrogen atom or an alkyl group, $X^1$ and $X^2$ each independently represent an oxygen atom or $-N(R^5)-$, $R^5$ represents a hydrogen atom, an alkyl group, an aryl group, or a heteroaryl group, $X^3$ and $X^4$ each represent a boron atom, $Y^1$, $Y^2$, $Y^3$, and $Y^4$ each independently represent a monovalent substituent, $Y^1$ and $Y^2$, and $Y^3$ and $Y^4$ may be respectively bonded to each other to form a ring, in a case where a plurality of $Y^1$'s, $Y^2$'s, $Y^3$'s, and $Y^4$'s are present, the plurality of $Y^1$'s, the plurality of $Y^2$'s, the plurality of $Y^3$'s, and the plurality of $Y^4$'s may be respectively bonded to one another to form a ring, p and s each independently represent an integer of 0 to 3, and q and r each independently represent an integer of 0 to 2.

8. The method of producing a resin molded article according to claim 7,
wherein the resin is at least one resin selected from the group consisting of polyester, polyamide, and polyurethane.

9. The method of producing a resin molded article according to claim 7,
wherein a colorant is further kneaded in the resin kneaded material.

* * * * *